United States Patent
Shima et al.

(10) Patent No.: US 7,536,576 B2
(45) Date of Patent: May 19, 2009

(54) STORAGE APPARATUS AND POWER SUPPLY CONTROL METHOD THEREOF

(75) Inventors: Seiji Shima, Odawara (JP); Kosaku Kambayashi, Odawara (JP)

(73) Assignee: Hitachi, Ltd., Tokyo (JP)

( * ) Notice: Subject to any disclaimer, the term of this patent is extended or adjusted under 35 U.S.C. 154(b) by 343 days.

(21) Appl. No.: 11/472,410

(22) Filed: Jun. 22, 2006

(65) Prior Publication Data

US 2007/0250723 A1    Oct. 25, 2007

(30) Foreign Application Priority Data

Apr. 21, 2006  (JP) .............................. 2006-118375

(51) Int. Cl.
*G06F 1/26* (2006.01)
(52) U.S. Cl. .................. 713/340; 713/310; 714/14; 714/22; 361/601
(58) Field of Classification Search ................ 713/310, 713/324, 340; 714/14, 22; 361/601, 622, 361/685; 307/126
See application file for complete search history.

(56) References Cited

U.S. PATENT DOCUMENTS

| | | | |
|---|---|---|---|
| 6,990,553 B2 | 1/2006 | Nakayama et al. | |
| 7,035,972 B2 * | 4/2006 | Guha et al. | 711/114 |
| 2002/0053897 A1 * | 5/2002 | Kajiwara et al. | 323/272 |
| 2003/0093721 A1 * | 5/2003 | King et al. | 714/42 |

FOREIGN PATENT DOCUMENTS

JP    2004-227098    8/2004

* cited by examiner

*Primary Examiner*—Thuan N Du
(74) *Attorney, Agent, or Firm*—Antonelli, Terry, Stout & Kraus, LLP.

(57) ABSTRACT

This storage apparatus has a plurality of units for transferring or storing data sent from an information processing device, and includes a failure notification unit for notifying a failed unit among the plurality of units, a power supply switching command unit for commanding the switching of off and on of the power supply of the failed unit notified from the failure notification unit, and a power supply switching unit for switching off and thereafter switching on the power supply of the failed unit according to the command of the power supply switching command unit.

4 Claims, 28 Drawing Sheets

FIG.8

| UNIT | POWER REQUIREMENT | POWER SUPPLY STATUS | APPARENT POWER | EFFECTIVE POWER | POWER FACTOR | VOLTAGE (V) | CURRENT (A) |
|---|---|---|---|---|---|---|---|
| 511 | 5.5 | NORMAL | 7.2 | 5.5 | 80 | 100 | 5.5 |
| 512 | 10 | ABNORMAL (VOLTAGE DROPPING) | 11.3 | 9.1 | 79 | 100 | 9.1 |
| ... | 10 | ABNORMAL (VOLTAGE UNSTABLE) | 12.4 | 10.1 | 81 | 100 | 10.1 |
| 540-1 | 15 | POWER SUPPLY OFF | 0 | 0 | 0 | 0 | 0 |
| 540-2 | 5.0 | ABNORMAL (VOLTAGE INSUFFICIENCY) | 5.6 | 4.5 | 80 | 99 | 4.4 |
| ... | ... | ... | ... | ... | ... | ... | ... |

| UNIT | TIME STAMP | POWER SUPPLY STATUS | POWER FACTOR | APPARENT POWER | EFFECTIVE POWER | EFFECTIVE POWER FACTOR | VOLTAGE (V) | CURRENT (A) |
|---|---|---|---|---|---|---|---|---|
| 512 | 2005/12/8 08:12:02:000 | NORMAL | 80 | 7.2 | 5.5 | 0.5 | 100 | 5.5 |
| | 2005/12/8 08:15:02:000 | RETRY REQUEST (OFF→ON) | 0 | 0 | 0 | 0 | 0 | 0 |
| | 2005/12/8 08:22:02:000 | NORMAL | 80 | 7.2 | 5.5 | 0.6 | 100 | 5.5 |
| | 2005/12/8 08:28:02:000 | STOP REQUEST (ON→OFF) | 0 | 0 | 0 | 0 | 0 | 0 |
| | 2005/12/8 08:31:02:000 | ABNORMAL (DROP) | 79 | 4.2 | 3.3 | 0.8 | 100 | 3.3 |
| | 2005/12/8 08:32:02:000 | ABNORMAL (OFF) | 0 | 0 | 0 | 0 | 0 | 0 |
| | 2005/12/8 08:37:02:000 | START REQUEST (OFF→ON) | 0 | 0 | 0 | 0 | 0 | 0 |
| | 2005/12/8 08:42:02:000 | NORMAL | 79 | 7.2 | 5.4 | 0.5 | 100 | 5.4 |
| | ⋯ | ⋯ | ⋯ | ⋯ | ⋯ | ⋯ | ⋯ | ⋯ |

| UNIT IDENTIFIER | ERROR TYPE | MONITORING INTERVAL (a) | ERROR LEVEL | MAXIMUM THRESHOLD VALUE |
|---|---|---|---|---|
| CHA_A | FM FAILURE | 10 | 7 | 3 |
| | INTERNAL COMPONENT FAILURE | 0 | 10 | 0 |
| | PORT FAILURE | 10 | 8 | 3 |
| | PORT_Link FAILURE | 60 | 6 | 3 |
| | I/O FAILURE | 10 | 5 | 3 |
| | BOOT FAILURE | 10 | 3 | 2 |
| | INITIALIZATION FAILURE | 10 | 4 | 2 |
| | DATA DISCREPANCY | 30 | 4 | 2 |
| | POWER ABNORMALITY (INSUFFICIENCY) | 30 | 3 | 3 |
| | POWER ABNORMALITY (EXCESS) | 30 | 3 | 3 |
| | ...... | ...... | ... | ... |
| CHF_B | INTERNAL COMPONENT FAILURE | 0 | 10 | 0 |
| ... | ...... | ...... | ... | ... |
| DKA_AA | INTERNAL COMPONENT FAILURE | 0 | 10 | 0 |
| ... | ...... | ...... | ... | ... |

| NUMBER | UNIT NUMBER | UNIT IDENTIFIER | FAILURE STATUS |
|---|---|---|---|
| 1 | 510-1 | CHA_A | PORT FAILURE |
| 2 | 510-2 | CHA_B | DATA DISCREPANCY |
| 3 | 510-4 | CHA_D | NORMAL |
| 4 | 511 | PORT_1A | NORMAL |
| 5 | 514 | PORT_7B | DATA DISCREPANCY |
| 6 | 513 | PORT_9B | NORMAL |
| 7 | 512 | PORT_3A | PORT FAILURE |
| 8 | 540-2 | DKA_B | FM FAILURE |
| 9 | 540-1 | DKA_A | INTERNAL COMPONENT FAILURE |
| 10 | 540-3 | DKA_C | NORMAL |
| 11 | 510-3 | CHA_C | I/O FAILURE |
| ... | .... | .... | .... |

| UNIT NUMBER | FAILURE IDENTIFICATION | FAILURE OCCURRENCE COUNT | RECOVERY PROCESSING COUNT |
|---|---|---|---|
| 511 | PORT FAILURE | 3 | 1 |
|  | FM FAILURE | 0 | 0 |
|  | ......... | ......... | ......... |
|  | .... | .... | .... |

FIG.13

| UNIT NUMBER | TIME STAMP | UNIT IDENTIFIER | FAILURE STATUS | RECOVERY PROCESSING |
|---|---|---|---|---|
| 512 | 2005/12/8 09:10:02:000 | CHA_A | NORMAL | - |
| | 2005/12/8 09:12:02:000 | CHA_A | PORT FAILURE | - |
| | 2005/12/8 09:17:02:000 | CHA_A | PORT FAILURE | AUTOMATIC RECOVERY PROCESSING 1 |
| | 2005/12/8 09:18:02:000 | CHA_A | | REBOOT PROCESSING START |
| | 2005/12/8 09:18:20:000 | CHA_A | | REBOOT PROCESSING END |
| | ......... | ......... | ......... | ......... |
| | 2005/12/8 09:23:02:000 | CHA_A | MALFUNCTION | |
| | 2005/12/8 08:37:02:000 | CHA_A | | MANUAL EXCHANGE PROCESSING |
| | 2005/12/8 08:38:02:000 | CHA_A | | REBOOT PROCESSING START |
| | 2005/12/8 08:38:20:000 | CHA_A | | REBOOT PROCESSING END |
| | 2005/12/8 08:42:02:000 | CHA_A | NORMAL | ......... |
| | ......... | ......... | ......... | |

| ROUTE NUMBER | PORT NUMBER | CHANNEL CONTROLLER 510 | DISK CONTROLLER 540 | SHARED SPACE 520/530 | STORAGE DEVICE 600 |
|---|---|---|---|---|---|
| 1 | 511, 512 | 510-1 | 540-1, 540-2 | Q1 | 600-1, 600-2, ··· |
| 2 | 512, 513, 514 | 510-1, 510-2 | 540-1, 540-2 | Q1 | 600-1, 600-2, ··· |
| 3 | 516, 517, 518 | 510-3, 510-4 | 540-3, 540-4 | Q1 | 600-4, 600-5, ··· |
| ··· | | | | | ··· |

| ROUTE NUMBER | PROCESSING NUMBER | OUT IN DIFFERENCE VALUE (SAMPLE VALUE) |
|---|---|---|
| 1 | 1 | 00:00:00:000:010:000 |
|  | 3 | 00:00:00:000:005:000 |
|  | 4 | 00:00:00:000:005:000 |
|  | .... | .... |

| ROUTE NUMBER | SAMPLE SUM | SAMPLE MEAN | SAMPLE DEVIATION | UNPROCESSED COMMAND COUNT | FAILED COMMAND PROCESSING COUNT |
|---|---|---|---|---|---|
| 1 | 100000 | 30 | 10 | 2 | 1 |
| 2 | 155555 | 50 | 16 | 1 | 3 |
| 3 | 300000 | 10 | 3 | 0 | 0 |
| .... | .... | .... | .... | .... | .... |

FIG.26

HEAVY — LIGHT

[CACHE MEMORY] > [SHARED MEMORY] > [DISK CONTROLLER] > [CHANNEL CONTROLLER] > [STORAGE DEVICE] > [COOLING UNIT]

| | | Y1 | Y2 | Y3 | Y4 | Yn |
|---|---|---|---|---|---|---|
| | ROUTE NUMBER Lc | FAILED UNIT COUNT | COMMAND AVERAGE PROCESSING TIME | RESIDENT (UNPROCESSED) COMMAND COUNT | FAILED COMMAND PROCESSING COUNT | .... |
| | | WEIGHT COUNT:40 | WEIGHT COUNT:30 | WEIGHT COUNT:20 | WEIGHT COUNT:10 | .... |
| X1 | 1 | 4 | 30 | 2 | 1 | .... |
| X2 | 2 | 5 | 50 | 1 | 3 | .... |
| X3 | 3 | 1 | 10 | 0 | 0 | .... |
| Xn | .... | .... | .... | .... | .... | .... |

STORAGE APPARATUS AND POWER SUPPLY CONTROL METHOD THEREOF

CROSS-REFERENCES TO RELATED APPLICATIONS

This application relates to and claims priority from Japanese Patent Application No. 2006-118375, filed on Apr. 21, 2006, the entire disclosure of which is incorporated herein by reference.

BACKGROUND

The present invention can be suitably applied to a storage apparatus having a plurality of units for transferring or storing data sent from a host computer.

In recent years, a storage apparatus that provides a storage extent of data to a host computer is able to comprise numerous large-capacity physical disks, and the increase of storage capacity is progressing. With this kind of storage apparatus, a disk array configured from RAID (Redundant Array of Independent Disks) is foremost created from a storage device, a plurality of such physical storage resources are gathered, and the storage extent of a capacity requested by the host computer is created and provided to the host computer.

For instance, the storage device controller of Japanese Patent Laid-Open Publication No. 2004-227098 (Patent Document 1) comprises a channel controller including a circuit board formed with a file access processing unit for receiving a data I/O request sent from an information processing device in file units via a network and an I/O processor for outputting the corresponding I/O request to the storage device, and a disk controller for executing the data I/O to the storage device according to the I/O request sent from the I/O processor, wherein the channel controller receives the data designated with the allocation of a logical volume to the channel controller sent from the information processing device, and stores such allocation.

Meanwhile, with the storage device controller of Patent Document 1, for instance, when a failure occurs in a prescribed unit of the channel controller or the disk controller in the storage apparatus, when rebooting such unit, there is a problem in that a user (maintenance worker) must perform complicated operations such as physically turning off the power supply of such unit directly, and thereafter physically turning on the power supply directly.

SUMMARY

The present invention was made in view of the foregoing points. Thus, an object of the present invention is to propose a storage apparatus and its power supply control method capable of dramatically improving the operability upon rebooting a unit.

In order to achieve the foregoing object, the present invention provides a storage apparatus having a plurality of units for transferring or storing data sent from an information processing device, comprising a failure notification unit for notifying a failed unit among the plurality of units, a power supply switching command unit for commanding the switching of off and on of the power supply of the failed unit notified from the failure notification unit, and a power supply switching unit for switching off and thereafter switching on the power supply of the failed unit according to the command of the power supply switching command unit.

Accordingly, a user (maintenance worker) does not have to perform complicated operations such as physically turning off the power supply of a failed unit directly, and thereafter physically turning on the power supply directly. Thus, by the user (maintenance worker) merely issuing a command with the power supply switching command unit, it is possible to turn off the power supply of the failed unit, and thereafter turn on the power supply so as to reboot the failed unit.

The present invention also provides a power supply control method of a storage apparatus having a plurality of units for transferring or storing data sent from an information processing device, comprising the steps of notifying a failed unit among the plurality of units, commanding the switching of off and on of the power supply of the failed unit notified at the notifying step, and switching off and thereafter switching on the power supply of the failed unit according to the command at the commanding step.

Accordingly, a user (maintenance worker) does not have to perform complicated operations such as physically turning off the power supply of a failed unit directly, and thereafter physically turning on the power supply directly. Thus, by the user (maintenance worker) merely issuing a command with the power supply switching command unit, it is possible to turn off the power supply of the failed unit, and thereafter turn on the power supply so as to reboot the failed unit.

According to the present invention, since a failed unit is notified among the plurality of units, the switching of off and on of the power supply of the failed unit notified at the notifying step is commanded, and the power supply of the failed unit is switched off and thereafter switched on, a user (maintenance worker) does not have to perform complicated operations such as physically turning off the power supply of a failed unit directly, and thereafter physically turning on the power supply directly. Thus, by the user (maintenance worker) merely issuing a command with the power supply switching command unit, it is possible to turn off the power supply of the failed unit, and thereafter turn on the power supply so as to reboot the failed unit. Accordingly, it is possible to realize a storage apparatus and its power supply control method capable of dramatically improving the operability upon rebooting a unit.

DESCRIPTION OF DRAWINGS

FIG. 8 is a conceptual diagram explaining the power supply status management table according to an embodiment of the present invention;

FIG. 9 is a conceptual diagram explaining the unit-by-unit power supply status management table according to an embodiment of the present invention;

FIG. 10 is a conceptual diagram explaining the unit-by-unit error type management table according to an embodiment of the present invention;

FIG. 11 is a conceptual diagram explaining the unit-by-unit failure status management table according to an embodiment of the present invention;

FIG. 12 is a conceptual diagram explaining the unit-by-unit failure history management table according to an embodiment of the present invention;

FIG. 13 is a conceptual diagram explaining the unit-by-unit failure log management table according to an embodiment of the present invention;

FIG. 16 is a conceptual diagram explaining the route management table according to an embodiment of the present invention;

FIG. 20 is a conceptual diagram explaining the stack processing time management time according to an embodiment of the present invention;

FIG. 21 is a conceptual diagram explaining the command processing probability management table according to an embodiment of the present invention;

FIG. 26 is a conceptual diagram explaining the unit-by-unit failure weight ratio according to an embodiment of the present invention;

FIG. 27 is a conceptual diagram explaining the route failure weight relationship management table according to an embodiment of the present invention;

DETAILED DESCRIPTION

Embodiments of the present invention are now explained in detail with reference to the attached drawings.

(1) Overall Configuration of Storage System in Present Embodiment

Figure 1:
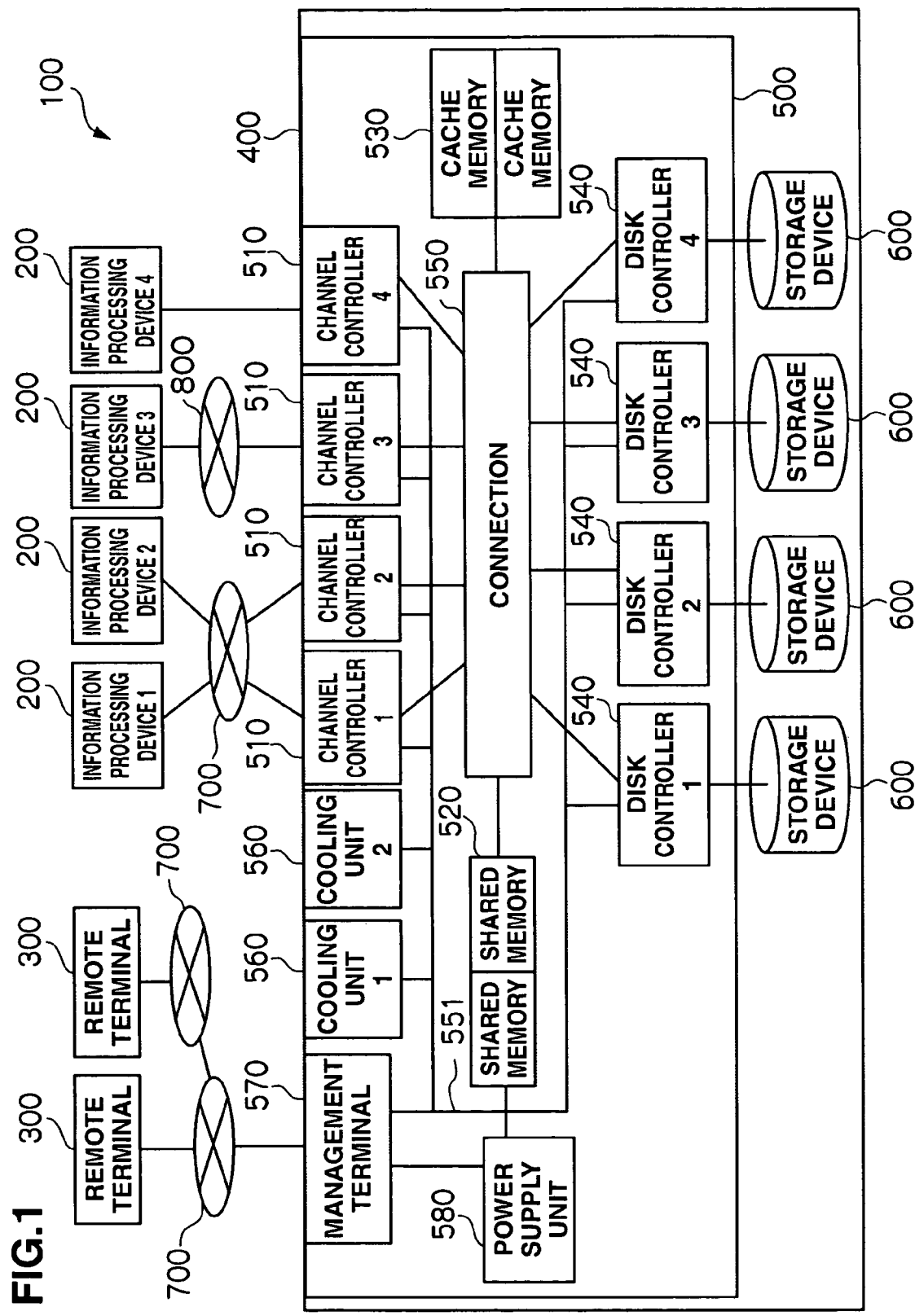
FIG. 1 is a block diagram showing the overall configuration of the storage system according to an embodiment of the present invention.

Foremost, FIG. 1 is a block diagram showing the overall configuration of the storage system 100 according to the present embodiment. The storage system 100 comprises an information processing device 200, a remote terminal 300, and a storage apparatus 400. The information processing device 200 and the remote terminal 300 are connected to the storage apparatus 400 via a network such as a LAN (Local Area Network) or a SAN (Storage Area Network).

The information processing device 200 is a computer comprising a CPU (Central Processing Unit) (not shown), a memory (not shown), a display unit (not shown) and so on. The CPU of the information processing device 200 realizes various functions by executing various programs. The information processing device 200, for instance, may be a personal computer or a workstation, or it may be a mainframe computer.

The remote terminal 300 is also a computer comprising a CPU (Central Processing Unit) (not shown), a memory (not shown), a display unit (not shown) and so on. The CPU of the remote terminal 300 realizes various functions by executing various programs. The remote terminal 300, for instance, may be a personal computer or a laptop personal computer.

The storage apparatus 400 comprises a storage device controller 500 and a storage device 600. The storage device controller 500 controls the storage device 600 according to commands received from the information processing device 200. For example, the storage device controller 500 receives a data I/O request from the information processing device 200, and performs processing for inputting and outputting data stored in the storage device 600. Data is stored in a logical volume (Logical Unit) (this is also referred to as "LU") as a storage extent logically set in a physical storage extent provided by a disk drive of the storage device 600. The storage device controller 500 also sends and receives various commands for managing the storage apparatus to and from the information processing device 200.

Referring to FIG. 1, the information processing devices 1, 2 (200) are connected to the storage device controller 500 via the LAN 700. The LAN 700 may be the Internet or a dedicated network. Communication between the information processing devices 1, 2 (200) and the storage device controller 500 via the LAN 700 is connected, for instance, according to the TCP/IP (Transmission Control Protocol/Internet Protocol) protocol. The information processing devices 1, 2 (200) send a data access request by designating file names (data I/O request in file units; hereinafter referred to as a "file access request") to the storage apparatus 400.

The storage device controller 500 comprises a channel controller 510, a shared memory 520, a cache memory 530, a disk controller 540, a connection 550, a cooling unit 560, a management terminal 570, and a power supply unit 580.

The storage device controller 500 comprises channel controllers 1, 2 (510). The storage device controller 500 conducts communication with the information processing devices 1, 2 (200) via the LAN 700 with the channel controllers 1, 2 (510). The channel controllers 1, 2 (510) are sometimes indicated as CHN 510.

The channel controllers 1, 2 (510) individually accept file access requests from the information processing devices 1, 2 (200). As a result, the storage apparatus 400 will be able to perform comprehensive management, and it is thereby possible to seek the streamlining of maintenance procedures such as various settings and controls, failure management and version management.

Incidentally, the channel controllers 1 to 4 (510) of the storage device controller 500 according to the present embodiment are realized with hardware formed on an integrally unitized circuit board and the operating system (hereinafter sometimes indicated as "OS") executed by such hardware, or by software such as an application program operating on such OS. As described above, with the storage apparatus 400 of this embodiment, functions that were conventionally loaded as a part of hardware are realized with software. Thus, with the storage apparatus 400 of this embodiment, it is possible to realize a flexible system operation, and provide finely-tuned services to demanding users with various needs.

The information processing device 3 (200) is connected to the storage device controller 500 via the SAN 800. The SAN 800 is a network for sending and receiving data to and from the information processing device 3 (200) in block units, which is the management unit of data in the storage extent provided by the storage device 600. Communication between the information processing device 3 (200) and the storage device controller 500 via the SAN 800 is generally conducted according to a fibre channel protocol. The information processing device 3 (200) sends a data access request in block units (hereinafter referred to as a "block access request") to the storage apparatus 400 according to the fibre channel protocol.

Figure 2:
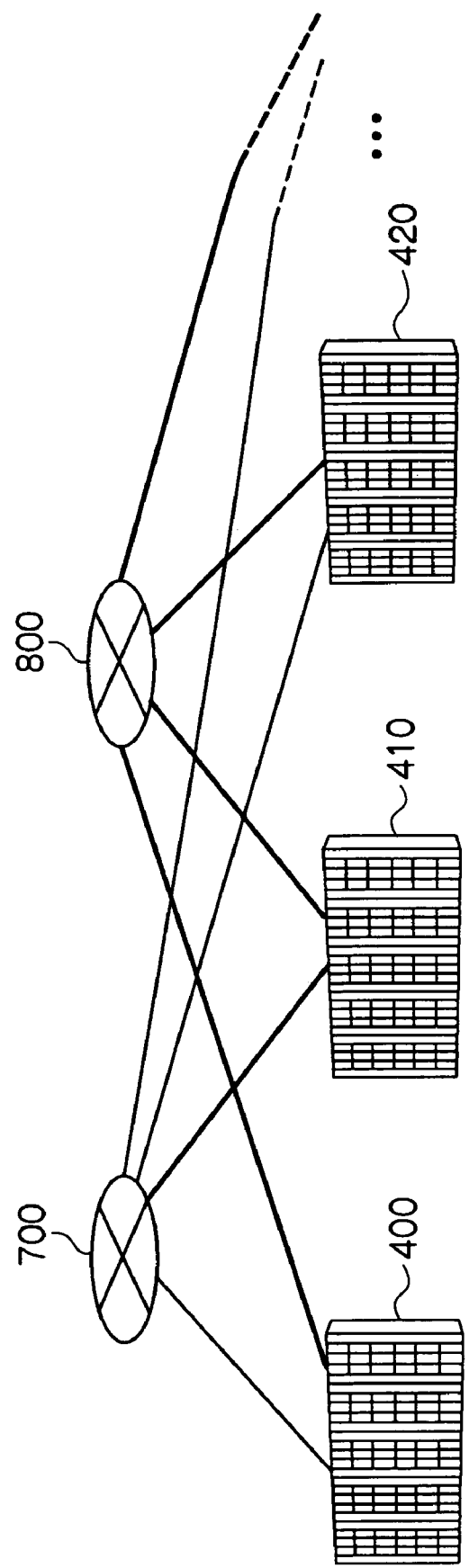
FIG. 2 is a schematic diagram showing the connective configuration with another SAN-compatible storage apparatus according to an embodiment of the present invention.

FIG. 2 shows the connective configuration with another SAN-compatible storage apparatus. As shown in FIG. 2, the SAN 800 is connected to a SAN-compatible backup device (storage apparatus 420). The SAN-compatible backup device stores backup data of data stored in the storage device 600 by communicating with the storage device controller 500 via the SAN 800.

The storage device controller 500 comprises a channel controller 3 (510). The storage device controller 500 communicates with the information processing device 3 (200) via the SAN 800 based on the channel controller 3 (510). The channel controller 3 (510) is sometimes indicated as CHF 510.

The information processing device 4 (200) is connected to the storage device controller 500 without going through a network such as the LAN 700 or SAN 800. The information processing device 4 (200), for instance, is a mainframe computer. Communication between the information processing device 4 (200) and the storage device controller 500, for instance, is conducted according to a communication protocol such as FICON (Fibre Connection) (registered trademark), ESCON (Enterprise System Connection) (registered trademark), ACONARC (Advanced Connection Architecture) (registered trademark), FIBARC (Fibre Connection Architecture) (registered trademark), or iSCSI (registered trademark). The information processing device 4 (200) sends a block access request to the storage apparatus 400 according to the foregoing communication protocol.

The storage device controller 500 communicates with the information processing device 4 (200) based on the channel controller 4 (510). The channel controller 4 (510) is sometimes indicated as CHA 510.

As shown in FIG. 2, the SAN 800 is connected to another storage apparatus 510 installed at a location (secondary site) that is remote from the installation site (primary site) of the storage apparatus 400. The storage apparatus 510 is used as an apparatus of the replication destination of data in the replication or remote copy function described later. Incidentally, the storage apparatus 510 may also be connected to the storage apparatus 400 via a communication line such as ATM (Asynchronous Transfer Mode) in addition to the SAN 800. In this case, with the storage apparatus 400, for example, a channel controller 510 comprising an interface (channel extender) for using this communication line is adopted as the channel controller 510.

With the storage apparatus 400 of this embodiment, by mixing and mounting the CHN 510, CHF 510, and CHA 510, it is possible to realize a storage apparatus that is connected to different networks. Specifically, the storage apparatus 400 is a SAN-integrated storage apparatus which connects to the LAN 700 using the CHN 510 and connects to the SAN 800 using the CHF 510.

The storage device 600 comprises a plurality of disk drives (physical disks), and provides a storage extent to the information processing device 200. Data is stored in the LU as a storage extent that is logically set in a physical storage extent provided by the disk drives. As the disk drive, for instance, a hard disk device, flexible disk device, semiconductor memory device and other devices may be used. Incidentally, the storage device 600, for instance, may also be configured as a disk array using a plurality of disk drives. In this case, the storage extent to be provided to the information processing device 200 may also be provided by a plurality of disk drives managed with RAID (Redundant Array of Independent Disks).

The storage device controller 500 and the storage device 600 may be connected directly as shown in FIG. 1, or may be connected via a network. Further, the storage device 600 may also be formed integrally with the storage device controller 500.

The LU set in the storage device 600 is a user LU accessible from the information processing device 200 or a system LU to be used for controlling the channel controller 510. The system LU stores an operating system to be executed by the CHN. Moreover, each LU is associated with the respective channel controllers 510. Thus, with the storage apparatus 400, an accessible LU is allocated to each channel controller 510. Also, with this association, a plurality of channel controllers 510 may share a single LU. Incidentally, the user LU and system LU may be indicated as a user disk or a system disk below. The LU to be shared by a plurality of channel controllers 510 may be indicated as a shared LU or a shared disk.

The channel controller 510 comprises a communication interface for communicating with the information processing device 200, and comprises a function of sending and receiving data I/O commands and the like to and from the information processing device 200.

The CHN 510 accepts file access requests from the information processing device s1, 2 (200). The CHN 510 accesses the storage device 600 by outputting an I/O (Input/Output) request corresponding to the file access request in search of the storage address or data length of files. The storage apparatus 400 is thereby able to provide NAS service to the information processing devices 1, 2 (200). Incidentally, an I/O request contains the top address of data, data length, access type such as read or write, and so on. In the case of writing data, write data may be included in the I/O request.

The CHF 510 accepts block access requests from the information processing device 3 (200) according to a fibre channel protocol. The storage apparatus 400 will thereby be able to provide high-speed accessible data storage service to the information processing device 3 (200). Further, the CHA 510 accepts block access requests from the information processing device 4 (200) according to protocols such as FICON, ESCON, ACONARC, and FIBARC. The storage apparatus 400 will thereby be able to provide data storage services to a mainframe computer such as the information processing device 4 (200).

Each channel controller 510 is connected to the management terminal 570 via an internal LAN 551. The storage apparatus 400 is thereby able to send and install micro programs and the like to be executed by the channel controller 510 from the management terminal 570.

The connection 550 mutually connects the channel controller 510, the shared memory 520, the cache memory 530, and the disk controller 540. The sending and receiving of data and commands among the channel controller 510, the shared memory 520, the cache memory 530, and the disk controller 540 are conducted via the connection 550. The connection 550, for instance, is configured from an ultra-fast crossbar switch or high-speed bus that performs data transfer by way of high-speed switching. Thus, with the storage apparatus 400, since the channel controllers 510 are mutually connected via a high-speed bus, it is possible to significantly improve the communication performance among the channel controllers 510 in comparison to the conventional configuration wherein the NAS servers operating on individual computers being connected via a LAN. As a result, the storage apparatus 400 is able to realize high-speed file sharing functions and high-speed failover.

The shared memory 520 and the cache memory 530 are storage memories to be shared by the channel controllers 510 and the disk controllers 540. The shared memory 520 and the cache memory 530 perform dual control, and can be exchanged when one side is subject to a failure or is in operation. The shared memory 520 is primarily used for storing control information and commands, and the cache memory 530 is primarily used for storing data.

For example, when the data I/O command received by a certain channel controller 510 from the information processing device 200 is a write command, the channel controller 510 writes the write command in the shared memory 120, and writes the write data received from the information processing device 200 in the cache memory 530. Meanwhile, the disk controller 540 is monitoring the shared memory 120, and, when it detects that a write command has been written in the shared memory 120, it reads the write data from the cache memory 530 and writes it in the storage device 600 according to such command.

Further, when the data I/O command received by a certain channel controller 510 from the information processing device 200 is a read command, the channel controller 510 writes the read command in the shared memory 120, and checks whether the data to be read exists in the cache memory 530. If the [data to be read] exists in the cache memory 530, the channel controller 510 sends the data to the information processing device 200. Meanwhile, when the data to be read does not exist in the cache memory 530, the disk controller 540 monitors the shared memory 120, and, when it detects that a read command has been written in the shared memory 120, the [disk controller 540] reads the data to be read from the storage device 600, writes this in the cache memory 530, and writes to such effect in the shared memory 120.

When the channel controller 510 monitors the shared memory 120 and detects that the data to be read has been written in the cache memory 530, it sends that data to the information processing device 200. Although the shared memory 120 and the cache memory 530 are a shared space of all channel controllers 510 and the disk controllers 540, it is also possible to logically divide the shared space so as to divide the tasks.

The shared memory 520 stores the configuration information of the respective units (channel controller 510, shared memory 520, cache memory 530, disk controller 540, cooling unit 560 or storage device 600) of the storage apparatus 400 illustrated in FIG. 1, route configuration information from the information processing device 200 to the storage device 600 of FIG. 5 described later, and unit number information. Incidentally, various other tables and programs which are or will be stored in the shared memory 520 are described later. The shared memory 520 and the cache memory 530 comprise a processing board, and are capable of realizing the various types of processing described later.

The storage apparatus 400 may be configured so that it can indirectly issue commands for writing or reading data from the channel controller 510 to the disk controller 540 via the shared memory 120 as described above, or it may also be configured to directly issue commands for writing or reading data from the channel controller 510 to the disk controller 540 without going through the shared memory 120.

The disk controller 540 performs the control of the storage device 600. For example, the disk controller 540 writes data in the storage device 600 according to the data write command received by the channel controller 510 from the information processing device 200 as described above. The disk controller 540 converts the data access request to the LU based on a logical address designation sent from the channel controller 510 into a data access request to the physical disk based on a physical address designation.

The disk controller 540 accesses data according to the RAID configuration when the physical disks in the storage device 600 are managed by RAID. The disk controller 540 also performs the replication management control and backup control of data stored in the storage device 600. The disk controller 540 also performs control (replication function or remote copy function) for storing replication of data stored in the storage apparatus 400 at the primary site in another storage apparatus 410 installed at a secondary site for the purpose of preventing data loss (disaster recovery) during disasters.

Each disk controller 540 is connected to the management terminal 570 via an internal LAN 551, and capable of communicating with each other. The storage apparatus 400 is thereby able to send and install micro programs and the like to be executed by the disk controller 540 from the management terminal 570.

With the storage apparatus 400 of this embodiment, although a was explained where the shared memory 120 and the cache memory 530 are provided independently to the channel controllers 510 and the disk controllers 540, the present invention is not limited thereto, and it is also preferable to distribute and provide the shared memory 120 or the cache memory 530 to the channel controllers 510 and the disk controllers 540. In this case, the connection 150 will mutually connect the channel controllers 510 and the disk controllers 540 having the distributed shared memory 120 or the cache memory 530.

The management terminal 570 is a computer comprising a CPU (Central Processing Unit) (not shown), a memory (not shown), a display unit (not shown) and so on. The CPU of the management terminal 570 realizes various functions by executing various programs. The management terminal 570 is a computer for maintaining and managing the storage apparatus 400. The user (maintenance worker), for instance, by operating the management terminal 570, is able to set the physical disk configuration in the storage device 600, set the LU, and install the micro programs to be executed in the channel controller 510 and the disk controller 540.

As the setting of the physical disk configuration in the storage device 600, for example, the physical disk may be added or removed, or the RAID configuration may be changed (change from RAID 1 to RAID 5, etc.). Further, the management terminal 570 may be used to confirm the operational status of the storage apparatus 400 or specify the malfunctioned unit, or install the operating system to be executed with the channel controller 510. The management terminal 570 is connected to an external maintenance center (remote terminal 300, etc.) via a LAN or a telephone line, and the management terminal 570 may be used to monitor the failure of the storage apparatus 400, or promptly respond in case of a failure. The occurrence of a failure, for instance, is notified from the OS or application program, or driver software. This notification is given with an HTTP (Hyper Text Transfer Protocol) protocol or SNMP (Simple Network Management Protocol), or email. The foregoing setting and control is performed by a remote operator using the Web page provided by the Web server operating on the management terminal 570 as the user interface. The remote operator is also able to operate the management terminal 570 and set the target or contents to be monitored for failure, or set the notification destination of such failure.

The management terminal 570 may be built in the storage device controller 500, or may be provided externally. The management terminal 570 may also be a computer for exclusively maintaining and managing the storage device controller 500 and the storage device 600, or a general-purpose computer may be given such maintenance and management functions. Incidentally, the various tables and programs which are or will be stored in the management terminal 570 are described later.

(2) Exterior Configuration of Storage System in Present Embodiment

Figure 3:
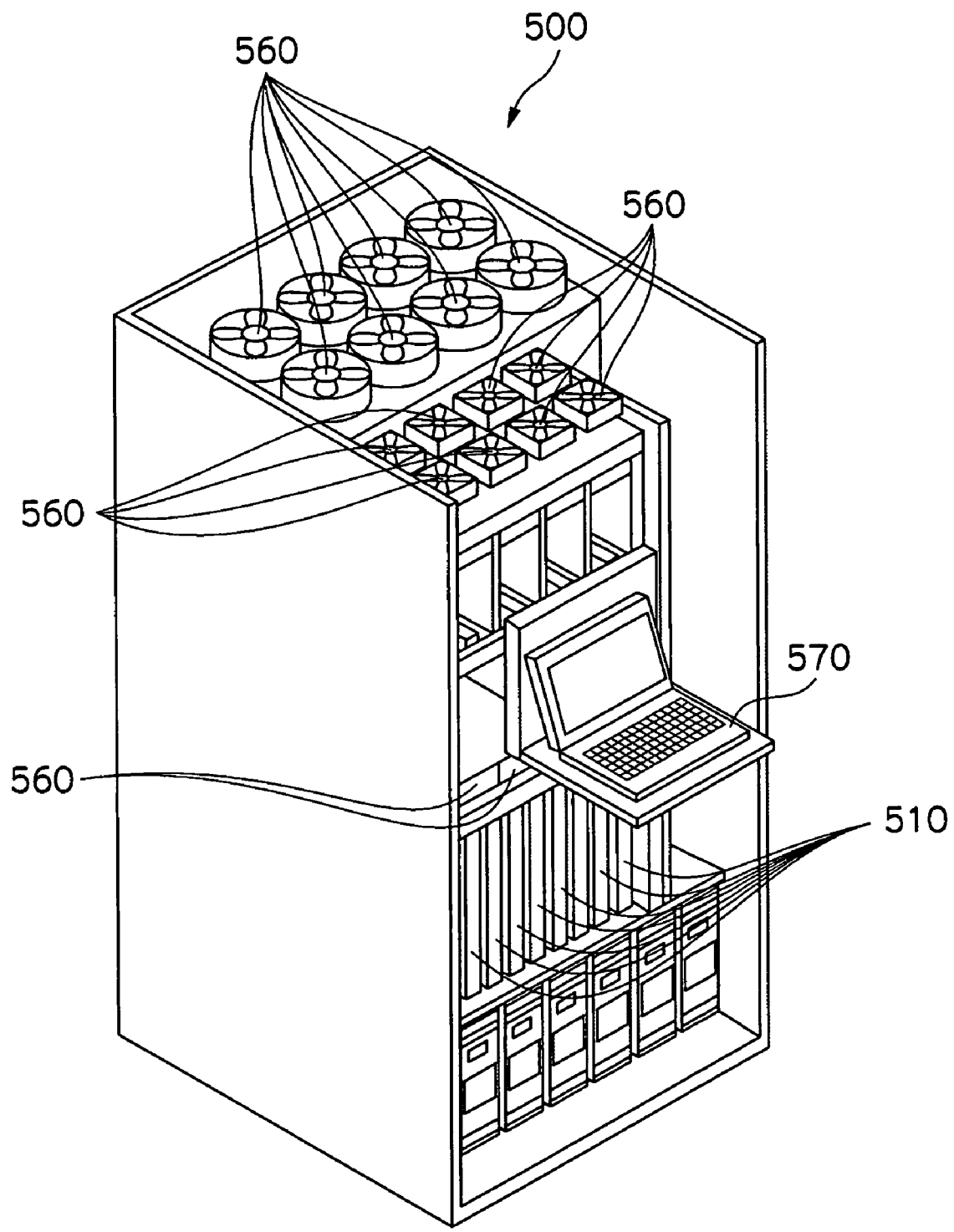
FIG. 3 is an exterior configuration of the storage device controller according to an embodiment of the present invention.
Figure 4:
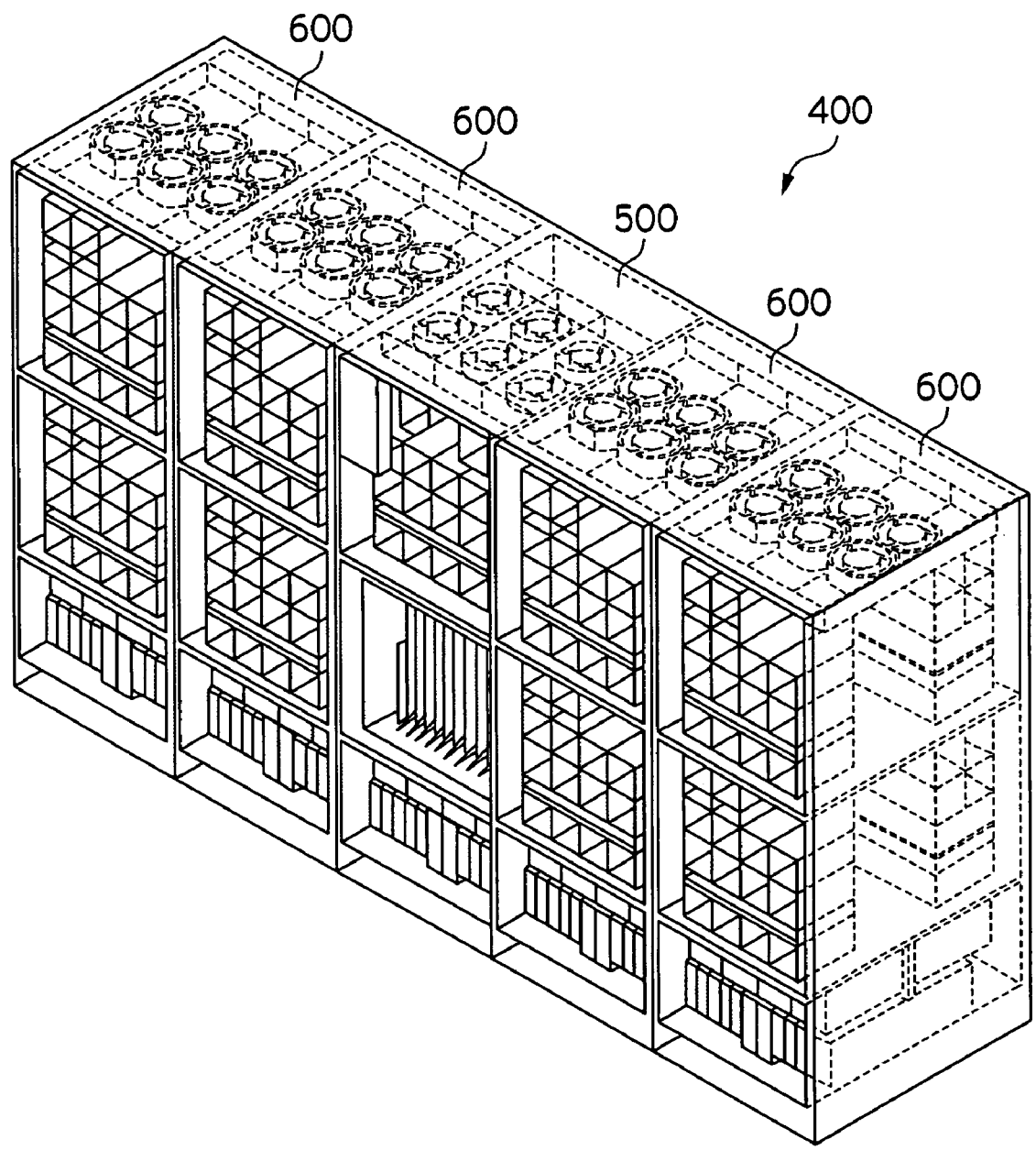
FIG. 4 is an exterior configuration of the storage apparatus according to an embodiment of the present invention.

FIG. 3 and FIG. 4 show the exterior configuration of the storage apparatus 400. As shown in FIG. 3 and FIG. 4, the storage apparatus 400 of this embodiment is configured by the storage device controller 500 and the storage device 600 being respectively housed in a cabinet. The cabinet of the storage device 600 is disposed at either ends of the cabinet of the storage device controller 500.

The storage device controller 500 comprises a management terminal 570 at the front center thereof. Incidentally, the management terminal 570 shown in FIG. 3 is in the form of a so-called laptop personal computer, but may be configured otherwise.

A slot for mounting the channel controllers 510 is provided to the lower part of the management terminal 570. A board of the channel controller 510 is mounted on each slot. The storage apparatus 400 of this embodiment has eight slots, and, as shown in FIG. 1 and FIG. 4, the channel controllers 510 are mounted on four slots. A guide rail for mounting the channel controller 510 is provided to each slot. The channel controller 510 is mounted on the storage device controller 500 by being inserted into the slot along the guide rail. Further, the channel controller 510 mounted on each slot is removed from the storage device controller 500 by being pulled out along the guide rail.

A connector for electrically connecting the respective channel controllers 510 to the storage device controller 50 is provided to the front face of the back end of the respective slots. There are different types of channel controllers 510 such as the CHN 510, CHF 510, and CHA 510, but all channel controllers 510 have compatibility in the size, position of connector, pin arrangement of connector and so on. Thus, any channel controller 510 can be mounted on the eight slots. Accordingly, the storage device controller 500 is able to mount CHN 510 on all eight slots based on the user's needs. The storage device controller 500 is also able to mount four CHN 510, two CHF 510, and two CHA 510. The storage device controller 500 may also be provided with slots that are not able to mount the channel controllers 510.

Incidentally, the storage device controller 500 has a dual system for supplying power in order to improve reliability, and is divided into fours for each power supply system in relation to the eight slots mounting the channel controller 510. When the storage device controller 500 is to configure a cluster, it will contain the channel controllers 510 of both power supply systems. With the storage device controller 500, even when a failure occurs in one power supply system and the supply of power is stopped, since the power supply to the channel controller 510 belong to the other power supply system configuring the same cluster will be continued, it is possible to continue (fail over) the processing with such channel controller 510.

Incidentally, as described above, although the storage device controller 500 is provided as a board capable of mounting the channel controller 510 on the respective slots; that is, as a single unit forming to the same unit, it may also be configured such that a same unit is configured from a plurality of substrates. In other words, when it is possible to integrally mount the [channel controllers 510] on the slot of the storage device controllers 500, even when the [same unit] is configured from a plurality of substrates, a single unit is configured by the substrates being mutually connected, and is included in the concept of being the same circuit board.

Although other devices such as the disk controller 540 and the shared memory 120 configuring the storage device controller 500 are not illustrated in FIG. 3 and FIG. 4, these are mounted on the back side of the storage device controller 500. Further, the storage device controller 500 with cooling units for discharging the heat arising from the channel controller 510. The cooling units 560, as shown in FIG. 3, are provided to the top face of the storage device controller 500, and provided at the top part of the slots for the channel controllers 510.

Meanwhile, as the storage device controller 500 and the storage device 600 configured by being housed in the cabinet, for instance, conventionally configured devices commercialized as a SAN-compatible product may be used. In particular, with the storage device controller 500, by forming the connector shape of the CHN 510 to be a shape so that it can be mounted on the slot provided to a conventionally configured cabinet, the conventionally configured device can be used more easily. In other words, the storage apparatus 400 of this embodiment can be configured easily with existing products.

The cooling units 560 are able to locally cool the target unit with fans and thermoelectric effect (Thomson effect, Peltier effect, Seebeck effect, etc.) materials. The storage device controller 500 and the storage device 600 are internally provided with temperature sensors at every corner to manage the temperature. In FIG. 3 and FIG. 4, although the cooling units 560 are shown at the top, they also exist internally. Each cooling unit 560 is supplied power independently, and, by adjusting the power, it is possible to adjust the rotating speed of the cooling unit 560 and to perform effective temperature adjustment. For example, when the peripheral temperature is low in a state where the channel controller 510, disk controller 540 or storage device 600 is not being used or is not supplied power, the storage device controller 500 and the storage device 600 are able to adjust the temperature of the cooling units 560 only for such peripheral area.

By displaying the exterior configuration shown in FIG. 3 and FIG. 4, the management terminal 570 is able to display the temperature status at the periphery of each unit (FIG. 3 and FIG. 4 are color coded for comprehending the temperature status) and the power supply status. Further, as a result of the user (maintenance worker) issuing commands by operating a mouse or the like based on the exterior configuration of FIG. 3 and FIG. 4 displayed on the management terminal 570, it is possible to adjust the temperature supply and power supply. Moreover, as a result of the user (maintenance worker) issuing commands by operating the mouse or the like, it is possible to supply, cut off or adjust the power of a designated unit at a necessary time or point.

Figure 5:
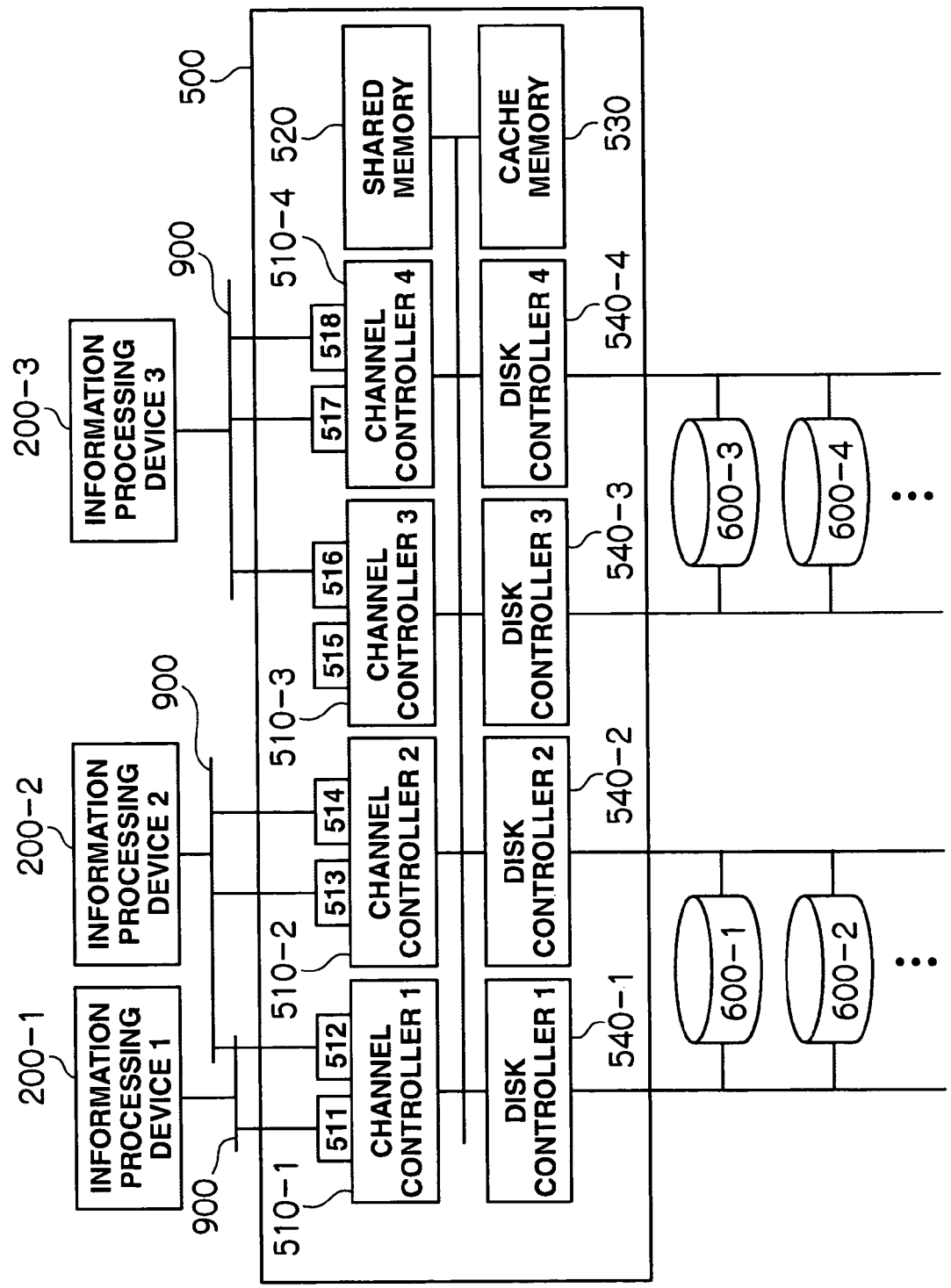
FIG. 5 is a conceptual diagram explaining the route configuration from the information processing device to the storage device according to an embodiment of the present invention.

FIG. 5 shows the route configuration from the information processing device 200 to the storage device 600. In this case, the channel controller 510 comprises ports 511 to 518 for connection with the information processing device 200. The ports 511 to 518 of the channel controller 510 can be activated and processed independently. As shown in FIG. 5, the information processing device 200 is able to simultaneously connect to the plurality of ports 511 to 518 via a connection line 900 of the LAN 700 or SAN 800. The channel controllers 510-1 to 4 and the disk controllers 540-1 to 4 are all connected via the connection 550 and an internal LAN 551 (not shown in FIG. 5). Thus, a certain channel controller 510 is able to access all disk controllers 540-1 to 4, and a certain disk controller 540 is able to access all channel controllers 510-1 to 4. This control can also be executed with the processing board of the shared memory 520 or the cache memory 530.

The storage device 600 is connected to a plurality of disk controllers 540, and each disk controller 540 is able to access the storage device 600. For example, the storage device controller 500 is able to access the storage devices 600 (600-1, 600-2 . . . ) from the alternate disk controller even when a failure occurs in the disk controller 1 (540-1) due to the duplication of the disk controllers 540 as shown in FIG. 4.

(3) Configuration of Power Supply Unit in Present Embodiment

Figure 6:
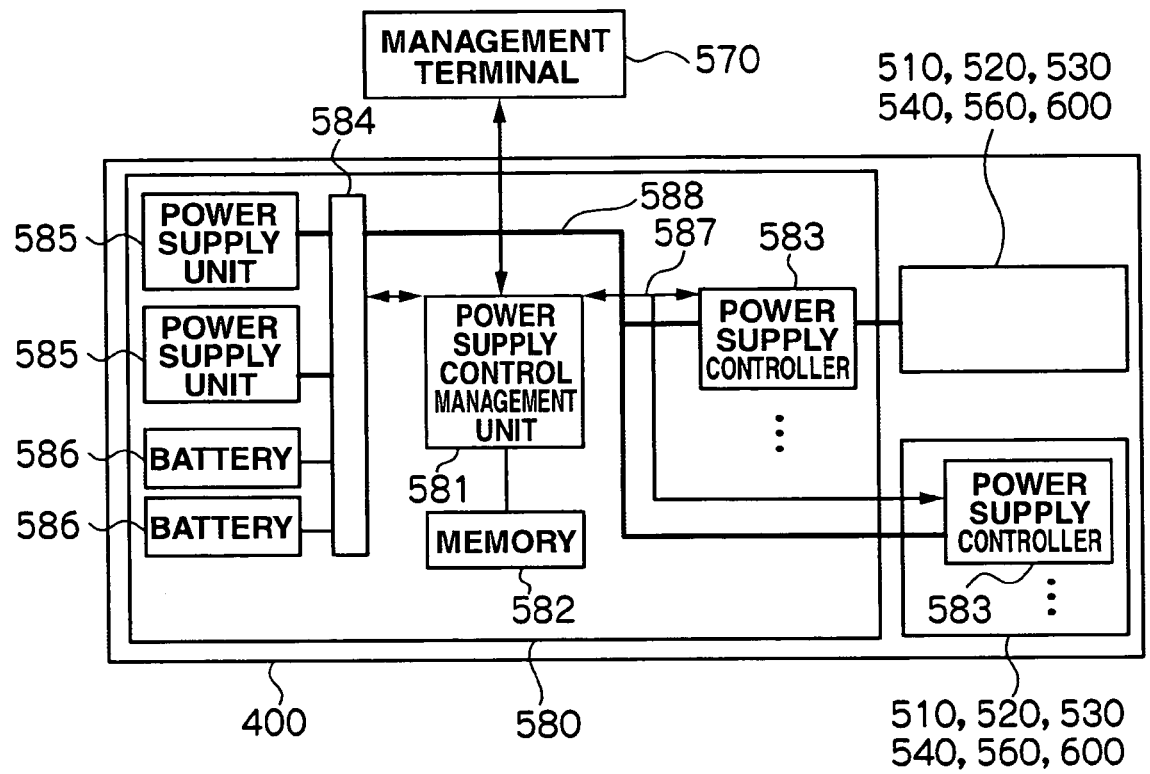
FIG. 6 is a conceptual diagram explaining the configuration of the power supply unit according to an embodiment of the present invention.

FIG. 6 shows the configuration of the power supply unit 580. The power supply unit 580 comprises a power supply control management unit 581, a memory 582, a power supply controller 583, a power supply unit 584, a power unit 585, and a battery 586. The power supply control management unit 581 and the power supply controller 583 may be formed integrally. The power supply control management unit 581 is able to acquire the failure status of the respective units from the shared memory 520. Further, the power supply control management unit 581 and the shared memory 520 are able to process, issue or acquire commands. The power 5 supply control management unit 581 and the power supply controller 583 are connected via a control line 587.

Figure 7:
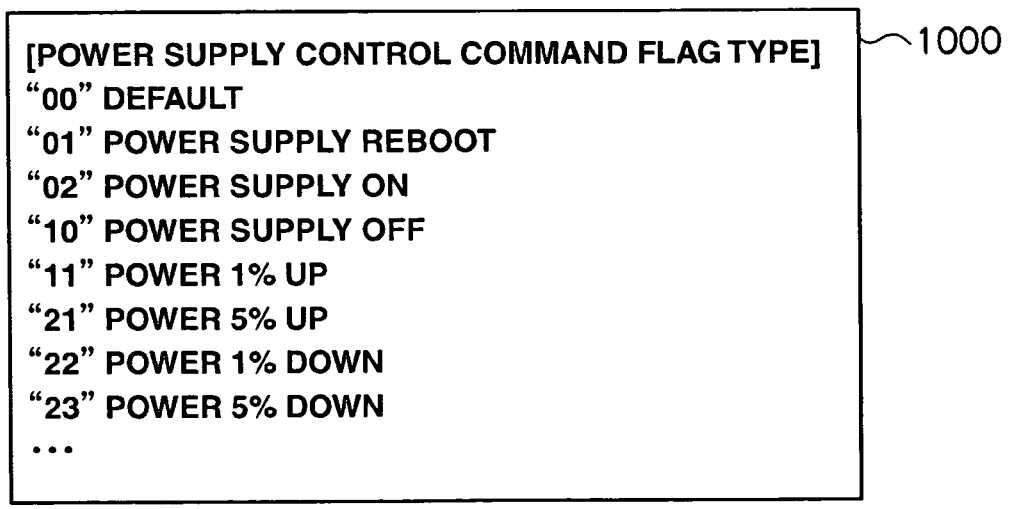
FIG. 7 is a conceptual diagram explaining the power supply control command flag type according to an embodiment of the present invention.

FIG. 7 shows the power supply control command flag type management table 1000. The power supply control command flag type management table 1000 is stored in the memory 582, and manages the power supply control command of power supply ON, power supply OFF, power 1% UP, power 5% UP, power 1% DOWN or power 5% DOWN. The power supply control management unit 581 is able to issue a power supply control command of the power supply control command flag type management table 1000 illustrated in FIG. 7 to the power supply controller 583.

Incidentally, when the power supply control management unit 581 comprises the power supply controller 583 in the respective units (channel controller 510, shared memory 520, cache memory 530, disk controller 540, cooling unit 560 or storage device 600), it can also issue the power supply control command to the power supply 20 controller 583 inside the respective units (channel controller 510, shared memory 520, cache memory 530, disk controller 540, cooling unit 560 or storage device 600). The power supply controller 583 provided to the respective units is able to operate the power supply within a local range (in port units, for instance) inside the units.

The power supply controller 583 and the power supply unit 584 are connected with a power supply line 588. The power supply line 589 is subject to measures for improving the reliability. By processing the power supply control command, the power supply controller 583 is able to supply, stop (discontinue the supply) or adjust the power from the power supply line 851 in component units. The power supply unit 584 supplies, stops or adjusts the power by controlling the duplicated and waiting power unit 585 (or battery 586).

The management terminal 570 is connected to the power supply control management unit 581 with a control line 588. The management terminal 570 is able to issue a power supply control command by setting the power supply control command to the target unit register of the power supply control management unit 581. This processing will be described later. The management terminal 570 may also issue a power supply control command by designating the target unit position and internal unit position with the shared memory 520.

(4) Information Management in Present Embodiment

FIG. 8 shows the power supply status management table 1010. The power supply status management table 1010 is stored in the memory 582, and, with the unit number as the main key, manages information such as the power supply status, apparent power, effective power, power factor, current, voltage, and request flag. The power supply control management unit 581 can be managed by updating the information of the power supply status management table 1010 shown in FIG. 8 in a timely manner.

The management terminal 570 acquires the information of the power supply status management table 1010 shown in FIG. 8 from the power supply control management unit 581 in a timely manner, and manages the power supply status of the respective units corresponding to the respective unit numbers in a time series. Further, the management terminal 570 acquires the information of the power supply status management table 1010 shown in FIG. 8 from the power supply control management unit 581 at the point in time the power supply control management unit 581 notifies the management terminal 570 of a status change or configuration change. The management terminal 570 can also acquire information of the power supply status management table 1010 shown in FIG. 8 at an arbitrary timing or a periodic timing.

In this case, the management terminal 570 creates a unit-by-unit power supply status management table 1020 for monitoring the status transition of the power supply status of each unit from the information of the power supply status management table 1010 shown in FIG. 8 acquired from the power supply control management unit 581, stores this in a memory (not shown) of the management terminal 570, or updates the unit-by-unit power supply status management table 1020. FIG. 9 shows the unit-by-unit power supply status management table 1020. The unit-by-unit power supply status management table 1020, with the unit number as the main key, manages the time stamp showing the time in which the information of the power supply status management table 1010 shown in FIG. 8 was acquired, as well as the power supply status, power factor, apparent power, effective power, coefficient of variation, voltage, and current of such time. The management terminal 570 is thereby able to analyze the coefficient of variation of power or unit tendency of each unit corresponding to the unit number.

FIG. 10 shows the unit-by-unit error type management table 1030. The unit-by-unit error type management table 1030 is stored in a memory (not shown) of the management terminal 570, and, with the unit identifier as the main key, manages the error type as well as the metadata of the monitoring interval, error level and maximum threshold value in relation to such error type. The management terminal 570 is able to change the respective values of such metadata (monitoring interval, error level and maximum threshold value) based on the operation of the user (maintenance worker).

FIG. 11 shows the unit-by-unit failure status management table 1040. The unit-by-unit failure status management table 1040 is stored in the shared memory 520, and manages the number, unit number, unit identifier, and failure status to be used in sorting. As a result of the management terminal 570 periodically acquiring and updating the information of the unit-by-unit failure status management table 1040 shown in FIG. 11 from the shared memory 520, it is able to comprehend the latest status of the failure status of each unit corresponding to each unit identifier. Further, when there is a possibility that a plurality of failures occurred inside the respective units, the management terminal 570 is able to automatically comprehend the failure status with the highest possibility. When a failure occurs in a certain unit, the management terminal 570 is notified the information of the unit-by-unit failure status management table 1040 shown in FIG. 11 at such point in time. Further, when a failure occurs in a certain unit, the shared memory 520 updates the information of the unit-by-unit failure status management table 1040 shown in FIG. 11 at such point in time.

The management terminal 570 creates a unit-by-unit failure history management table 1050 for managing the history of failure status information of each unit from the information of the unit-by-unit failure status management table 1040 shown in FIG. 11, stores this in a memory (not shown) of the management terminal 570, or updates the unit-by-unit failure history management table 1050. FIG. 12 shows the unit-by-unit failure history management table 1050. The unit-by-unit failure history management table 1050, with the unit number as the main key, manages the failure type as well as the failure occurrence count and recovery processing count for each failure type.

The management terminal 570 creates a unit-by-unit failure log management table 1060 for managing the information log of the failure status for each unit from the information of the unit-by-unit failure status management table 1040 shown in FIG. 11, stores this in a memory (not shown) of the management terminal 570, or updates the unit-by-unit failure log management table 1060. FIG. 13 shows the unit-by-unit failure log management table 1060. The unit-by-unit failure log management table 1060, with the unit number as the main key, manages the time stamp showing the time in which the information of the unit-by-unit failure status management table 1040 shown in FIG. 11 was acquired, as well as the unit identifier, failure status and recovery processing of such time.

Thereby, since the management terminal 570 will be able to manage the failure status log of the respective units in a time series, the user (maintenance worker) is able to analyze the maintenance response from the unit-by-unit failure log management table 1060 shown in FIG. 13.

Further, the management terminal 570 creates a disk controller-storage device relationship management table 1070 showing the relationship of the disk controller 540 and a connectable storage device 600 and a channel controller-disk controller relationship management table 1080 showing the relationship of the channel controller 510 and a connectable disk controller 540 from the configuration information of the respective units of the storage apparatus 400 shown in FIG. 1, configuration information and unit number information from the information processing device 200 to the storage device 600 shown in FIG. 5, and information of the unit-by-unit failure status management table 1040 shown in FIG. 11, stores this in a memory (not shown) of the management terminal 570, or updates the channel controller-disk controller relationship management table 1080.

Figure 14:
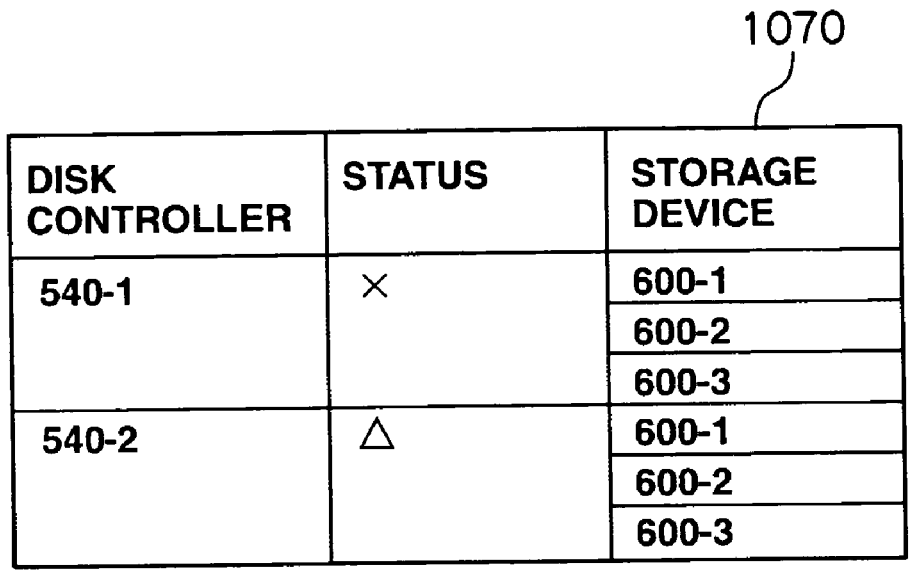
FIG. 14 is a conceptual diagram explaining the disk controller-storage device relationship management table according to an embodiment of the present invention.
Figure 15:
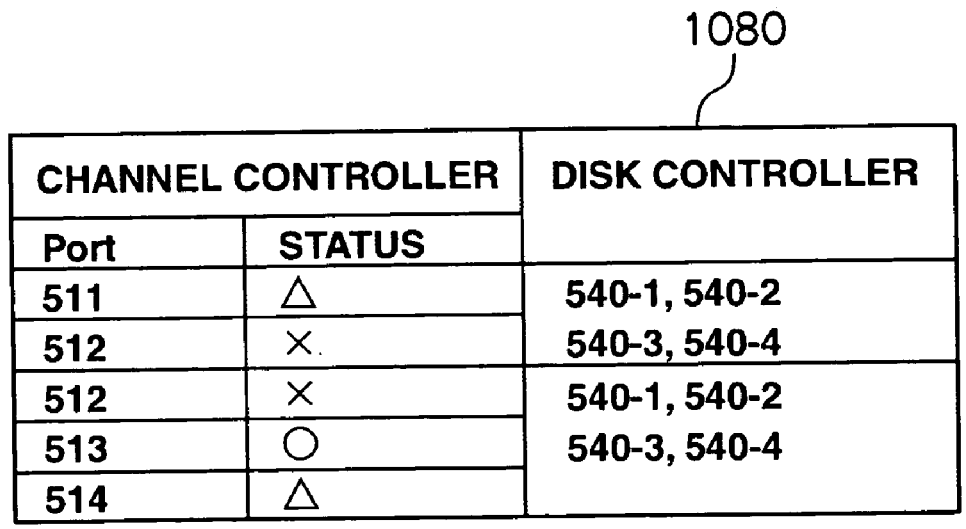
FIG. 15 is a conceptual diagram explaining the channel controller-disk controller relationship management table according to an embodiment of the present invention.

FIG. 14 shows the disk controller-storage device relationship management table 1070. The disk controller-storage device relationship management table 1070, with the disk controller as the main key, manages the status of the disk controller and the storage device connectable to the disk controller. FIG. 15 shows the channel controller-disk controller relationship management table 1080. The channel controller-disk controller relationship management table 1080, with the port of the channel controller as the main key, manages the status of the port and the disk controller connectable to the channel controller.

Based on the operation of the user (maintenance worker), the management terminal 570 is able to set or change the storage device 600 that is connectable to the disk controller 540, or the disk controller 540 that is connectable to the channel controller 510. the disk controller-storage device relationship management table 1070 and the channel controller-disk controller relationship management table 1080 represent the "status" indicating a normal status with "○", the "status" indicating a warning status with "Δ", and the "status" indicating an abnormal (not-ready) state where I/O processing cannot be performed with "x". Incidentally, "○" indicating the normal status corresponds to the error level "0" of the unit-by-unit error type management table 1030 shown in FIG. 10, "Δ" indicating the warning status corresponds to the error level "1 to 8", and "x" indicating the abnormal status corresponds to error level "9 to 10".

Thus, the management terminal 570 will be able to recognize the failure status of the disk controller 540 and the connectable storage device 600 from the disk controller-storage device relationship management table 1070 shown in FIG. 14. For example, the management terminal 570 is able to recognize the disk controller 540-2 in the case of accessing the storage device 600-1 by managing the failure status of the disk controller 540 and the connectable storage device 600 based on the disk controller-storage device relationship management table 1070 shown in FIG. 14.

Thus, the management terminal 570 will be able to recognize the failure status of the respective ports 512 to 518 and the connectable disk controller 540 from the channel controller-disk controller relationship management table 1080 shown in FIG. 15. For example, when the information processing device 200-1 is connected to a plurality of ports 511, 512 and one port 512 is of a failure status, the management terminal 570 is able to recognize that the storage device 600-1 can be accessed from the other port 512 by managing the failure status of the respective ports 512 to 518 and the connectable disk controller 540 based on the channel controller-disk controller relationship management table 1080 shown in FIG. 15.

In other words, the management terminal 570 recognizes that the disk controller 540-1 and port 512 are of a failure status, and the information processing device 200-1 is accessed (set as the route) by the storage device 600-1 via the port 511 and the disk controller 540-2. This kind of route setting may be set based on commands from the user (maintenance worker), or automatically set or changed in response to sudden failures. A route shows the flow path of data and commands from the ports 511 to 518 in the channel controller 510 to the storage device 600. Redundant routes or a plurality of routes may be set if the configuration becomes complex. The table for managing the route is managed and defined in a memory (not shown) of the management terminal 570. Processing of actual data and commands is performed at the right place at the right time and in a flexible and impromptu manner with the status and configuration of the route at such point in time while avoiding the risk of failure.

In this case, the management terminal 570 creates a route management table 1090 from the configuration information and unit number information from the information processing device 200 to the storage device 600 shown in FIG. 5, the disk controller-storage device relationship management table 1070 shown in FIG. 14, and the channel controller-disk controller relationship management table 1080 shown in FIG. 15, stores this in a memory (not shown) of the management terminal 570, or updates the route management table 1090.

FIG. 16 shows the route management table 1090. The route management table 1090 is stored in the management terminal 570, and, with the route number as the main key, manages the port number, channel controller, disk controller, shared space, and storage device. For example, the route management table 1090 is managing the flow path of data and commands of the ports 511, 512 and the storage device 600-1 with route number "1". Further, the route management table 1090 is also managing the flow path of data and commands of other ports 511 to 518 and the storage device 600. In this case, the management terminal 570 manages, based on the route management table 1090, the queue number in the port belonging to the target route (a plurality of ports if an alternate port), channel controller 510 belonging to the respective ports, storage device 600 accessible to the target route, disk controller for controlling the respective storage devices 600, and shared space (shared memory 520 and cache memory 530) for controlling the I/O processing of the target route.

Figure 17:
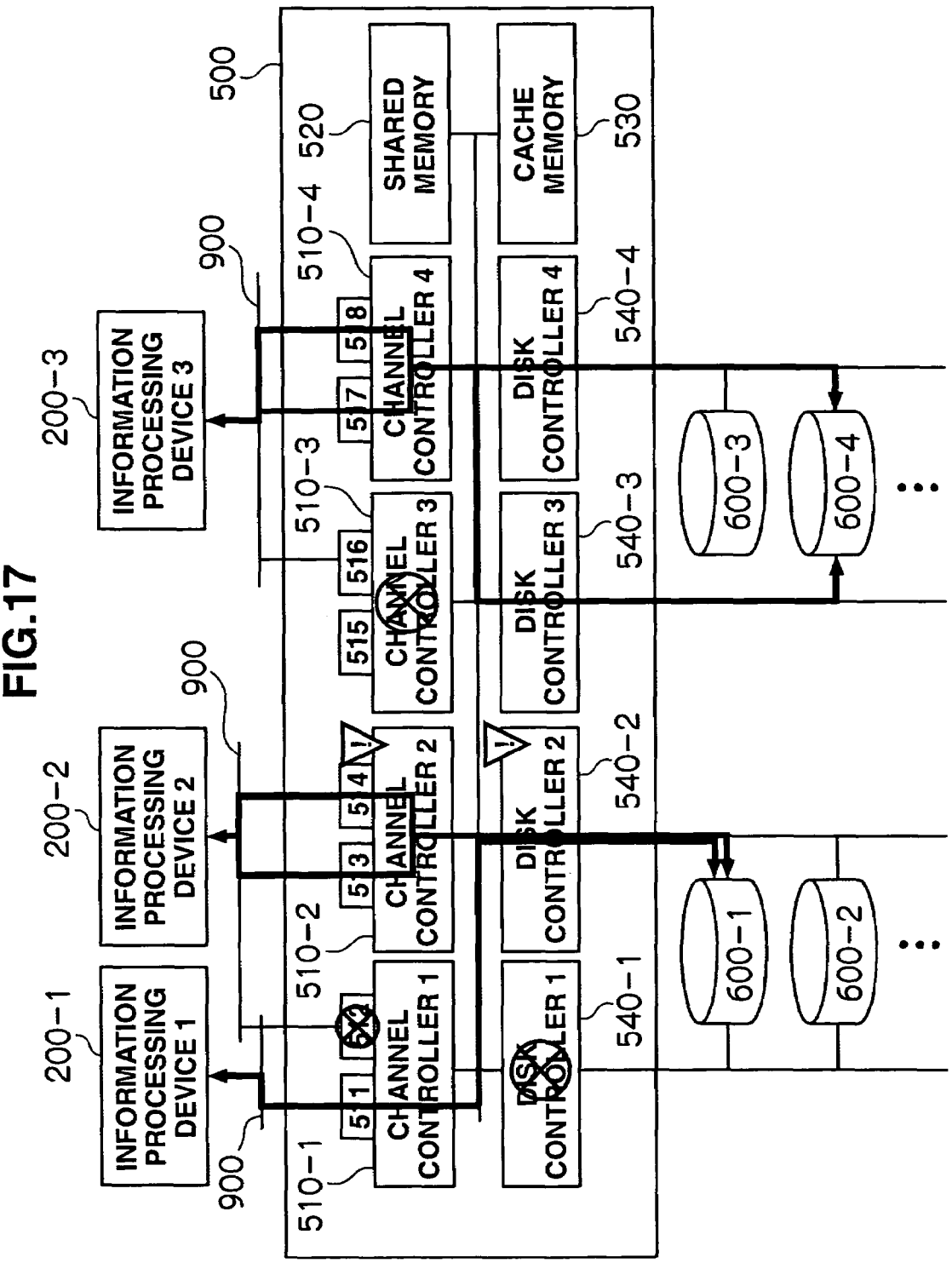
FIG. 17 is a conceptual diagram explaining the flow path of the actual data and commands according to an embodiment of the present invention.

FIG. 17 visually shows the flow path of actual data and commands based on the configuration information and unit number information from the information processing device 200 to the storage device 600 shown in FIG. 5, the disk controller-storage device relationship management table 1070 shown in FIG. 14, and the channel controller-disk controller relationship management table 1080 shown in FIG. 15. Since the port 512 and disk controller 540-1 are in an abnormal state, the route of route number "1" becomes "R1" for accessing the storage device 600-1 via the port 511 and the disk controller 540-2. Since the disk controller 540-1 is in an abnormal state, the route of route number "2" becomes "R2" for accessing the storage device 600-1 via the port 513 or port 514, and the disk controller 540-2. Since the channel controller 510-3 is in an abnormal state, the route of route number "3" becomes "R3" for accessing the storage device 600-4 via the port 517 or port 518, and the disk controller 540-3 or disk controller 540-4. Like this, the I/O processing of a route with numerous failures will be oppressed even if it is an important route.

Figure 18:
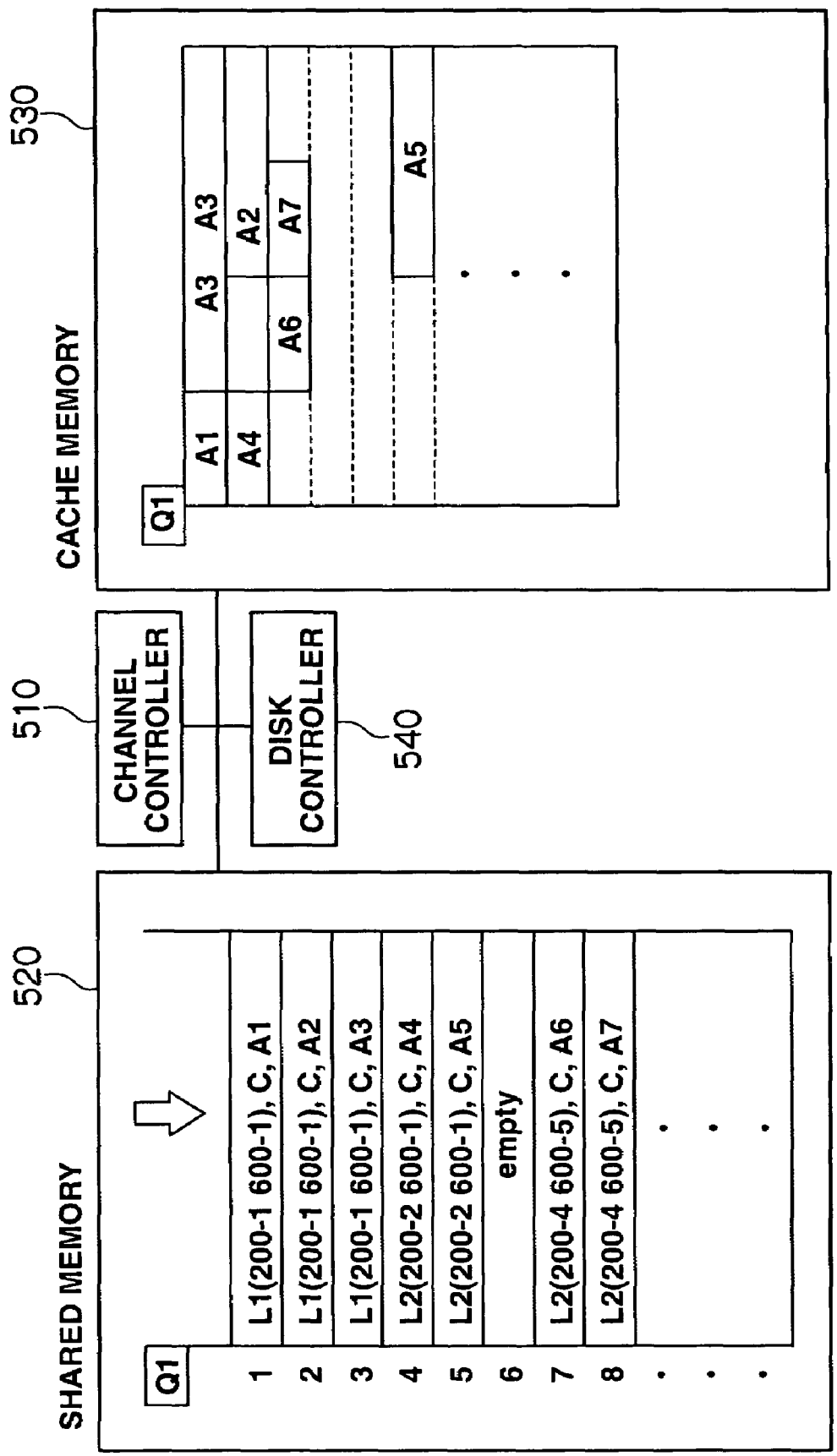
FIG. 18 is a conceptual diagram explaining the outline of processing in a shared space according to an embodiment of the present invention.

FIG. 18 shows the outline of processing in a shared space. As described above, the channel controller 510 and the disk controller 540 are performing I/O processing via a shared space (shared memory 520 and cache memory 530). Specifically, FIG. 18 shows the I/O processing in a certain divided/shared resource space Q1. In this case, the channel controller 510 and the disk controller 540 store a command sent from the information processing device 200 in the queue Q1 of the shared memory 520, and stores the data linked from the command in the queue Q1 of the cache memory 530. An empty space is searched from number "1" of the queue Q1 and the command is stored in an empty stack (empty). Further, a processed command will become an empty stack (empty). Inside the cache memory, data is similarly staged in an appropriate empty area, and destaging is performed once the processing is complete. The command records route information, command type, data information storage address, and other information. Route information records the route configuration, delivery destination of commands and data, and other information. The command type records the types such as read, write or order. Incidentally, the order command may be used to command the power supply operation to the power supply controller 583 shown in FIG. 6 via the shared memory 520 in special cases.

Figure 19:
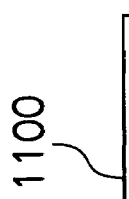
FIG. 19 is a conceptual diagram explaining the stack management table according to an embodiment of the present invention.

FIG. 19 shows the stack management table 1100. The stack management table 1100 is stored in the shared memory 520, and, with the stack number as the main key, manages the processing number, route number, stack in time, and stack out time of processing in command units. The shared memory 520 manages the stack number, processed processing number, stack in time stored in the stack, and stack out time disappeared from the stack for each queue based on the stack management table 1100.

FIG. 20 shows the stack processing time management time 1110. The stack processing time management time 1110 is stored in the shared memory 520, and, with the route number as the main key, manages the processing number and out-in difference value (sample value). The shared memory 520 manages the processing time in command units by managing the processing number and difference time from the stack in to stack out of the target route for each route based on the stack processing time management time 1110. In this case, the processing number is associated with the processing number in the stack management table 1100 shown in FIG. 19. A route with many units of a failure status oppress the processing, there is a possibility that the out-in difference value (sample value) will increase (processing will be delayed).

FIG. 21 shows the command processing probability management table 1120. The command processing probability management table 1120 is stored in the shared memory 520, and, with the route number as the main key, manages the sample sum, sample mean, standard deviation, unprocessed command count and failed command processing count. The shared memory 520 samples the out-in difference value (sample value) of the stack processing time management time 1110 shown in FIG. 20 to a periodic interval, calculates the sample sum, sample mean, and standard deviation for each route, and updates the command processing probability management table 1120. The unprocessed command count shall be the number of commands exceeding the "sample mean+ 3×standard deviation" in the target route. Failed command processing count shall be the number of failures in the command processing (sample) in the target route. The shared memory 520 is able to notify information of the command processing probability management table 1120 shown in FIG. 21 to the management terminal 570.

Figure 22:
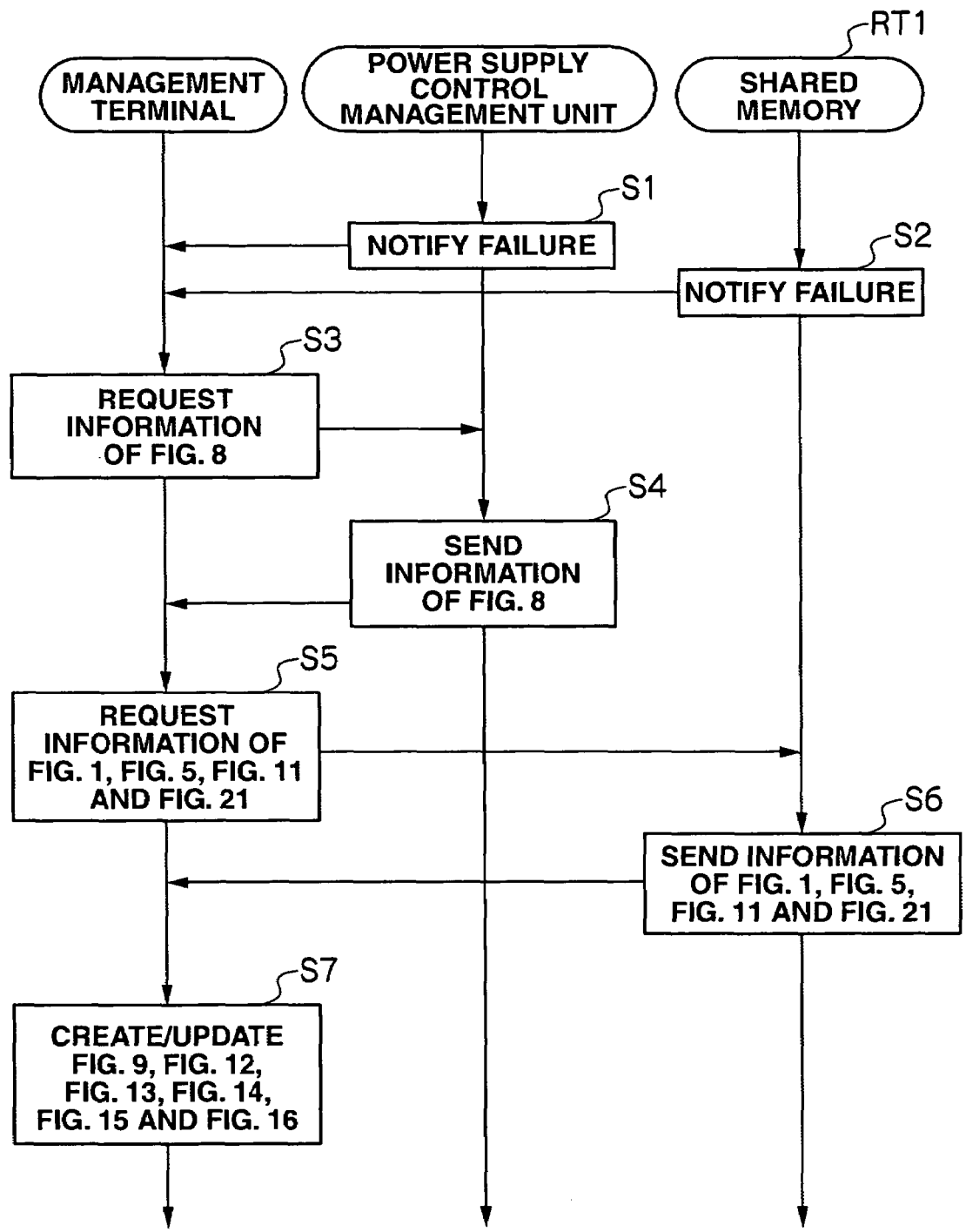
FIG. 22 is a flowchart explaining the table creation/update processing according to an embodiment of the present invention.

The table creation/update processing of the storage system 100 according to the present embodiment is now explained. FIG. 22 is a flowchart showing the specific processing routine of the storage apparatus 400 relating to the table creation/update processing in the storage system 100.

The management terminal 570, by initially executing the table creation/update processing program stored in a memory (not shown) of the management terminal 570 as a program for creating and updating various tables, waits in standby mode to receive a failure notice from the shared memory 520 and the power supply control management unit 581 according to the table creation/update processing routine RT1 shown in FIG. 22.

When a failure occurs in a certain unit, the shared memory 520 or the power supply control management unit 581 notifies the management terminal 570 that a failure has occurred (S1, S2). When the management terminal 570 receives a failure notice from the shared memory 520 or the power supply control management unit 581, it requests the information of the power supply status management table 1010 shown in FIG. 8 to the power supply control management unit 581 (S3). The power supply control management unit 581 sends to the management terminal 570 the information of the table requested from the management terminal 570 (S4).

Subsequently, the management terminal 570 requests the configuration information of the respective units of the storage apparatus 400 shown in FIG. 1, configuration information and unit number information from the information processing device 200 to the storage device 600 shown in FIG. 5, information of the unit-by-unit failure status management table 1040 shown in FIG. 11, and information of the command processing probability management table 1120 shown in FIG. 21 to the shared memory 520 (S5). The shared memory 520 transmits to the management terminal 570 to the information of the table requested from the management terminal 570 (S6).

Subsequently, the management terminal 570, based on the information sent from the shared memory 520 and the power supply control management unit 581, creates or updates the unit-by-unit power supply status management table 1020 shown in FIG. 9, the unit-by-unit failure history management table 1050 shown in FIG. 12, the unit-by-unit failure log management table 1060 shown in FIG. 13, the disk controller-storage device relationship management table 1070 shown in FIG. 14, the channel controller-disk controller relationship management table 1080 shown in FIG. 15, the route management table 1090 shown in FIG. 16, the route failure weight relationship management table 1130 shown in FIG. 17, and the abnormal unit list management table 1140 shown in FIG. 19 at their respective timing (S7).

Incidentally, the management terminal 570, for instance, is also able to periodically update the various tables by executing the processing at step S3 to step S7 in a prescribed timing such as for a preset time.

Figure 23:
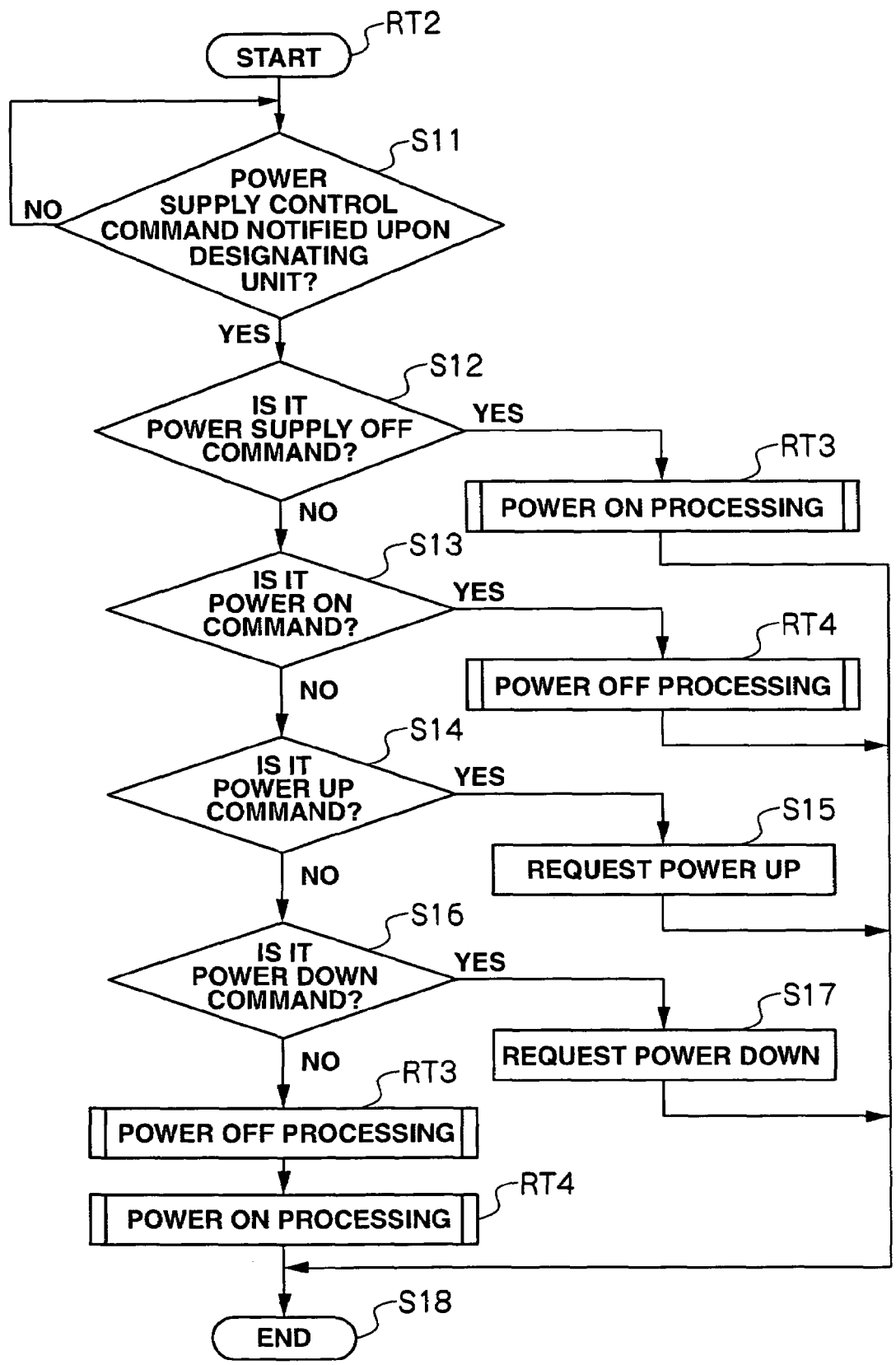
FIG. 23 is a flowchart explaining the power supply control processing according to an embodiment of the present invention.

The power supply control processing of the storage system 100 according to the present embodiment is now explained. FIG. 23 is a flowchart showing the specific processing routine of the storage apparatus 400 relating to the power supply control processing in the storage system 100.

The power supply control management unit 581, by initially executing the power supply control processing program stored in the memory 582 as a program for controlling the power supply of a prescribed unit, it designates a unit from the management terminal 570 and waits in standby mode to receive a notification of the power supply control command according to the power supply control processing routine RT2 shown in FIG. 23 (S11).

When the power supply control management unit 581 designates a unit from the management terminal 570 and receives a notification of the power supply control command (S11: YES), it checks whether the power supply control command is the ""02" power supply ON" command shown in FIG. 7 (S12).

Subsequently, when the power supply control command is the ""02" power supply ON" command shown in FIG. 7 (S12: YES), the power supply control management unit 581 executes the power supply ON processing (RT3).

Figure 24:
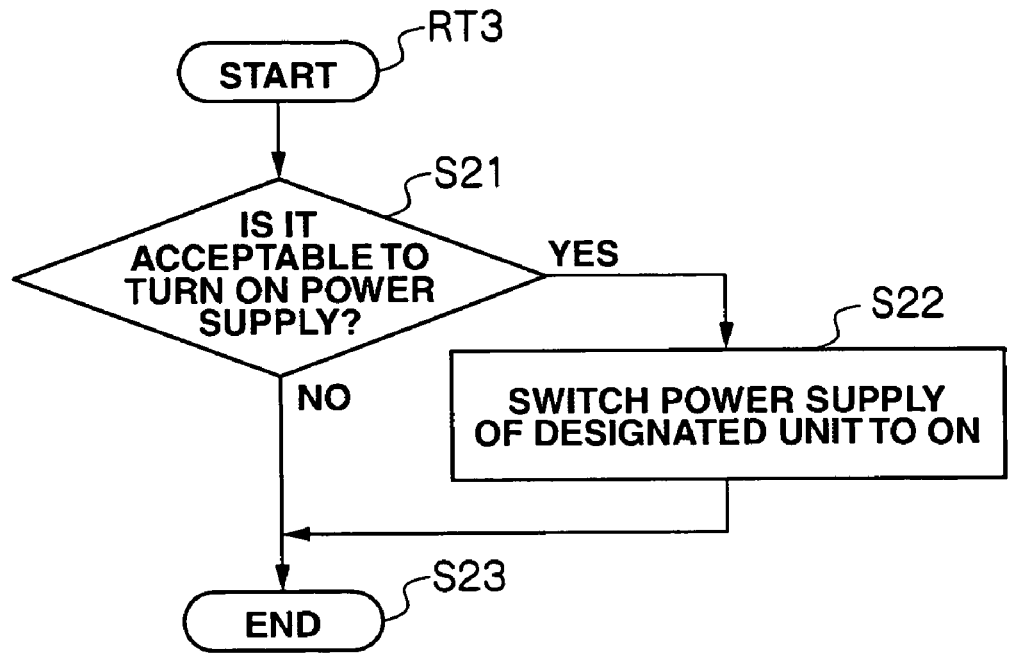
FIG. 24 is a flowchart explaining the power supply ON processing according to an embodiment of the present invention.

The power supply ON processing of the storage system 100 of this embodiment is explained below. FIG. 24 is a flowchart showing the specific processing routine of the storage apparatus 400 relating to the power supply ON processing in the storage system 100.

When the power supply control command is the ""02" power supply ON" command shown in FIG. 7 (S12: YES), the power supply control management unit 581 checks whether the power supply can be turned on (whether power can be supplied to the designated unit) according to the power supply ON processing routine RT3 shown in FIG. 24 by executing the power supply ON processing program stored in the memory 582 as a program for switching on the power supply of a prescribed unit (S21).

When the power supply can be turned on (S21: YES), the power supply control management unit 581 commands the power supply controller 583 to turn on the power supply of the designated unit, and switches on the power supply of the designated unit (S22). When the power supply control management unit 581 eventually switches on the power supply of the designated unit (S22), or when the power supply cannot be turned on (S21: NO), the [power supply control management unit 581] thereafter ends the power supply ON processing routine RT3 shown in FIG. 24 (S23).

When the power supply control management unit 581 eventually finishes performing the power supply ON processing (RT3), it thereafter ends the power supply control processing routine RT2 shown in FIG. 23 (S18).

Returning to FIG. 23, when the power supply control command is not the ""02" power supply ON" command shown in FIG. 7 (S12: NO), the power supply control management unit 581 checks whether the power supply control command is the ""10" power supply OFF" command shown in FIG. 7 (S13).

When the power supply control command is the ""10" power supply OFF" command shown in FIG. 7 (S13: YES), the power supply control management unit 581 executes the power supply OFF processing described later (RT4).

The power supply OFF processing of the storage system 100 of this embodiment is now explained. FIG. 24 is a flowchart showing the specific processing routine of the storage apparatus 400 relating to the power supply OFF processing in the storage system 100.

Figure 25:
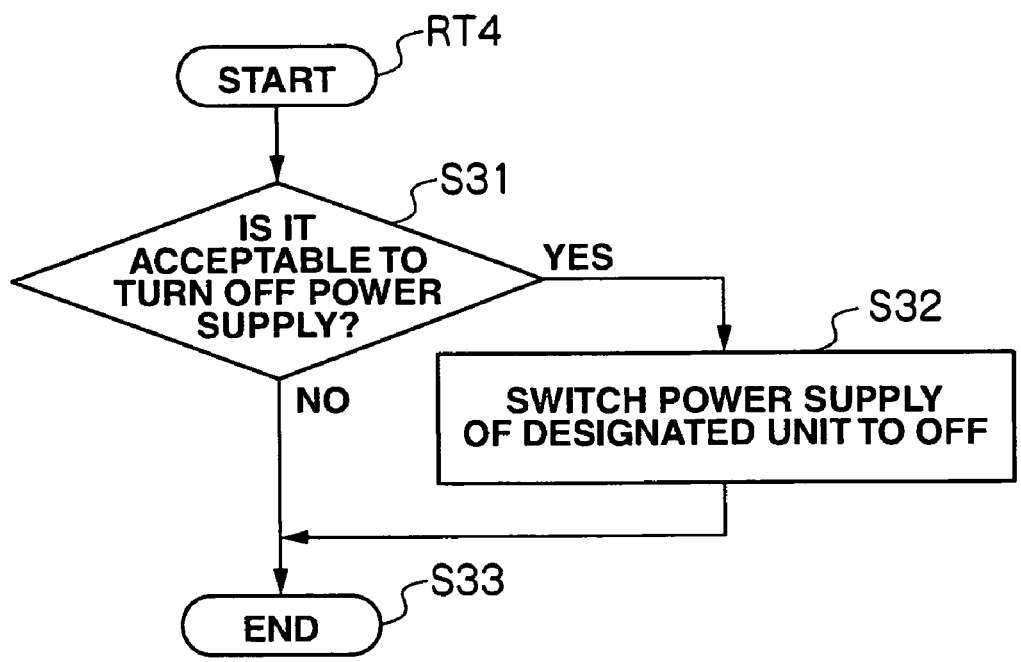
FIG. 25 is a flowchart explaining the power supply OFF processing according to an embodiment of the present invention.

When the power supply control command is the ""10" power supply OFF" command shown in FIG. 7 (S13: YES), the power supply control management unit 581 checks whether the power supply can be turned off (whether the power supply of the designated unit can be discontinued) according to the power supply OFF processing routine RT4 shown in FIG. 25 by executing the power supply OFF processing program stored in the memory 582 as a program for switching off the power supply of the prescribed unit (S31).

When the power supply can be turned off (S31: YES), the power supply control management unit 581 commands the power supply controller 583 to turn off the power supply of the designated unit, and then switches off the power supply of the designated unit (S32). When the power supply control management unit 581 eventually switches off the power supply of the designated unit (S32), or when the power supply cannot be turned off (S31: NO), the [power supply control management unit 581] thereafter ends the power supply OFF processing routine RT4 shown in FIG. 25 (S33).

Incidentally, as a case when the power supply cannot be turned off, for instance, considered may be when commands or data are flowing from the information processing device 200 to the designated unit, when there is an unprocessed command to the designated unit in the shared memory 520, when there is unprocessed data to the designated unit in the cache memory 530, and so on may be considered. Further, when turning off the power supply of a plurality of units, the power supply control management unit 581 turns off the power supply according to the priority of turning off the power supply. Nevertheless, there may be cases where the power supply control management unit 581 mandatorily turns off the power supply without checking whether the power supply can be turned off or the priority of turning off the power supply.

When the power supply control management unit 581 eventually finishes performing the power supply OFF processing (RT4), it thereafter ends the power supply control processing routine RT2 shown in FIG. 23 (S18).

Returning to FIG. 23, when the power supply control command is not the ""10" power supply OFF" command shown in FIG. 7 (S13: NO), the power supply control management unit 581 checks whether the power supply control command is the ""11" power 1% UP, "21" power 5% UP" command shown in FIG. 7 (S14).

When the power supply control command is the ""11" power 1% UP, "21" power 5% UP" command shown in FIG. 7 (S14: YES), the power supply control management unit 581 increased the power of the designated unit for the designated percentage (S15). Contrarily, when the power supply control command is not the ""11" power 1% UP, "21" power 5% UP" command shown in FIG. 7 (S14: NO), the power supply control management unit 581 checks whether the power supply control command is the ""22" power 1% DOWN, "23" power 5% DOWN" command shown in FIG. 7 (S16).

When the power supply control command is the ""22" power 1% DOWN, "23" power 5% DOWN" command shown in FIG. 7 (S16: YES), the power supply control management unit 581 reduces the power of the designated unit for the designated percentage (S17). Contrarily, when the power supply control command is not the ""22" power 1% DOWN, "23" power 5% DOWN" command shown in FIG. 7 (S16: NO), the power supply control management unit 581 executes the power supply OFF processing described above since the power supply control command is the ""01" power supply reboot" command shown in FIG. 7 (RT4).

Subsequently, when the power supply control management unit 581 finishes performing the power supply OFF processing, it executes the power supply ON processing described above (RT3), and thereafter ends the power supply control processing routine RT2 shown in FIG. 23 (S18).

Like this, with the storage apparatus 400, the power supply OFF processing of the unit designated by the user (maintenance worker) is performed, and the power supply ON processing is thereafter performed by the user (maintenance worker) operating the management terminal 570 and issuing commands from the management terminal 570. Thus, a user (maintenance worker) does not have to perform complicated operations such as physically turning off the power supply of a failed unit directly, and thereafter physically turning on the power supply directly. Thus, by the user (maintenance worker) merely issuing a command with the management terminal 570, it is possible to perform the power supply OFF processing, and thereafter perform the power supply ON processing so as to reboot the unit designated by the (maintenance worker).

In this case, since it is often the case that a failure is recovered merely by rebooting (turning off the power supply and then turning it on) the unit with the storage apparatus 400, by executing the power supply OFF processing and thereafter executing the power supply ON processing, it is possible to eliminate the potentially existing failures and to recover the failure by rebooting the failed unit as a result of initializing the uncontrollable active programs and unwanted data in the unit subject to a failure.

The storage apparatus 400 is also able to increase or reduce the power of the unit designated by the user (maintenance worker) by the user (maintenance worker) operating the management terminal 570 and issuing commands from the management terminal 570.

FIG. 26 shows the unit-by-unit failure weight ratio. In this case, with the storage apparatus 400, the cache memory 530 is set so that the weight of failure will be the heaviest, and the cooling unit 560 is set so that the weight of failure will be the lightest. This unit failure weight represents the priority of the power supply control according to the present invention, and, for instance, when the disk controller 540 and the channel controller 510 simultaneously become a failure status, the power supply control is performed first to the disk controller 540.

Since the shared memory 520 and the cache memory 530 could affect the overall storage apparatus 400 even with a slight degree of failure, these have a higher priority in comparison to other units. Subsequently, in order to reduce the number of non-performable command processing and data processing (reduce the oppression) of the shared memory 120 and the cache memory 130, priority of the lower level (on the disk controller 540) is set to be the next highest, and priority of the upper level (channel controller 510) is set to be the next highest since the upper level (channel controller 510) is recovered in a state where the lower level (disk controller 540) is normal and the reception of command processing and data processing is possible. Priority of the storage device 300 and the cooling unit 170 is set low since they will not affect the overall storage apparatus 400, and have a low degree of sharing, priority.

FIG. 27 shows the route failure weight relationship management table 1130. The route failure weight relationship management table 1130, with the route number as the main key, manages the failed unit count and the weighting factor thereof, command average processing time and the weighting factor thereof, unprocessed command count and the weighting factor thereof, as well as the failed command processing count and the weighting factor thereof. The management terminal 570 creates a route failure weight relationship management table 1130 from the information of the unit-by-unit failure status management table 1040 shown in FIG. 11, information of the route management table 1090 shown in FIG. 16, and information of the command processing probability management table 1120 shown in FIG. 21, stores this in a memory (not shown) of the management terminal 570, or updates the route failure weight relationship management table 1130. The weighting factor signifies the weight of the route failure (degree of danger of a failure occurring in the route). This has expandability of adding versatile new contents to Yn and adjusting the route failure weight (or customizing the weighting factor value).

Formula 1 shows the route failure weight calculation formula. The management terminal 570 calculates the failure weight of route units based on the route failure weight calculation formula from the route failure weight relationship management table 1130 shown in FIG. 27. The management terminal 570 executes power supply control in route units in descending order from the highest calculated value in this formula.

$$\text{Route \# } Lt \text{ Failure Weight} = \sum_{y=1}^{Yn} \left( \frac{Y_y X_{Lt}}{\sum_{x=1}^{Xn} Y_y X_x} \times \text{Weight Factor } Y_y \right) \quad (1)$$

The management terminal 570 calculates the route failure weight of the respective routes based on Formula 1.

For example, the failure weight of route number "1" from Formula 1 will be calculated as follows:

(4/(4+5+1)×40)+(30/(30+50+10)×30)+(2/(2+1+0)×20)+(1/(1+3+0)×10)=41.

Further, for example, the failure weight of route number "2" from Formula 1 will be calculated as follows:

(5/(4+5+1)×40)+(50/(30+50+10)×30)+(1/(2+1+0)×20)+(3/(1+3+0)×10)=49.

Moreover, for example, the failure weight of route number "3" from Formula 1 will be calculated as follows:

(1/(4+5+1)×40)+(10/(30+50+10)×30)+(0/(2+1+0)×20)+(0/(1+3+0)×10)=7.

Accordingly, the management terminal 570 will execute power supply control in the descending order of route 2→route 1→route 3 with the highest route failure weight.

Thus, with the storage apparatus 400, it is possible to improve the command processing and data processing speed of the shared memory 520 and the cache memory 530. In this case, a route will have many options when there are many redundant routes, and commands and data will be processed quickly. Nevertheless, a route without many options or a route with few options due to numerous failures will have a long processing queue, and it is likely that the performance will deteriorate. In addition, depending on the status of failure, there may be cases where uncontrollable commands and uncontrollable data will reside (become unprocessed) in the shared memory 520 and the cache memory 530.

Even if the storage apparatus 400 performs command processing and data processing in a logically divided shared space as a result of the shared space (shared memory 520 and cache memory 530) itself oppressing the command processing and data processing due to the processing deterioration or residency of the deteriorated route and the deteriorated route affecting the processing of sound routes, there is a possibility that the performance of the overall storage apparatus 400 will deteriorate. Thus, with the storage apparatus 400, it is possible to promptly improve the performance of the overall storage apparatus 400 by executing power supply control from the route having the highest level of oppression.

Figure 28:
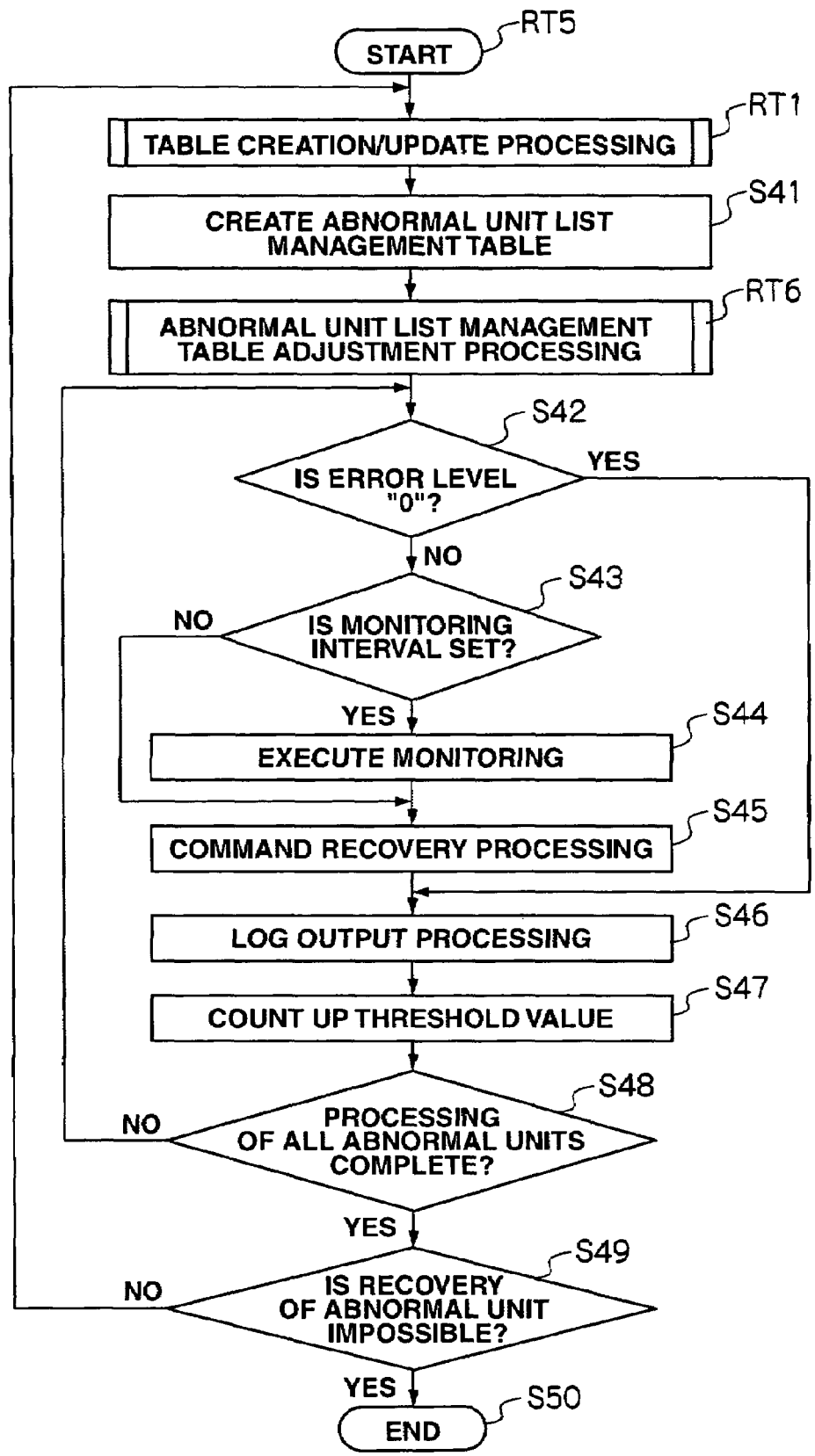
FIG. 28 is a flowchart explaining the failed unit recovery processing according to an embodiment of the present invention.

The failed unit recovery processing of the storage system 100 in this embodiment is now explained. FIG. 28 is a flowchart showing the specific processing routine of the storage apparatus 400 relating to the failed unit recovery processing in the storage system 100.

The management terminal 570, by initially executing the failed unit recovery program stored in a memory (not shown) of the management terminal 570 as a program for recovering the failed unit, executes the table creation/update processing program for creating and updating various tables according to the failure status recovery processing routine RT5 shown in FIG. 28, and thereafter executes the table creation/update processing routine RT1 shown in FIG. 22 (RT1).

Figure 29:
FIG. 29 is a conceptual diagram explaining the abnormal unit list management table according to an embodiment of the present invention.

Subsequently, the management terminal 570 excludes units in which the failure status is "normal" from the unit-by-unit failure status management table 1040 shown in FIG. 11 and extracts units with some kind of abnormality so as to create an abnormal unit list management table 1140, and stores this in a memory (not shown) of the management terminal 570 (S41). FIG. 29 shows the abnormal unit list management table 1140. The abnormal unit list management table 1140, with the number as the main key, manages the unit number, unit identifier and failure status.

Subsequently, when the management terminal 570 creates the abnormal unit list management table 1140, it executes the abnormal unit list management table adjustment processing for adjusting the abnormal unit list management table 1140 (RT6).

Figure 30:
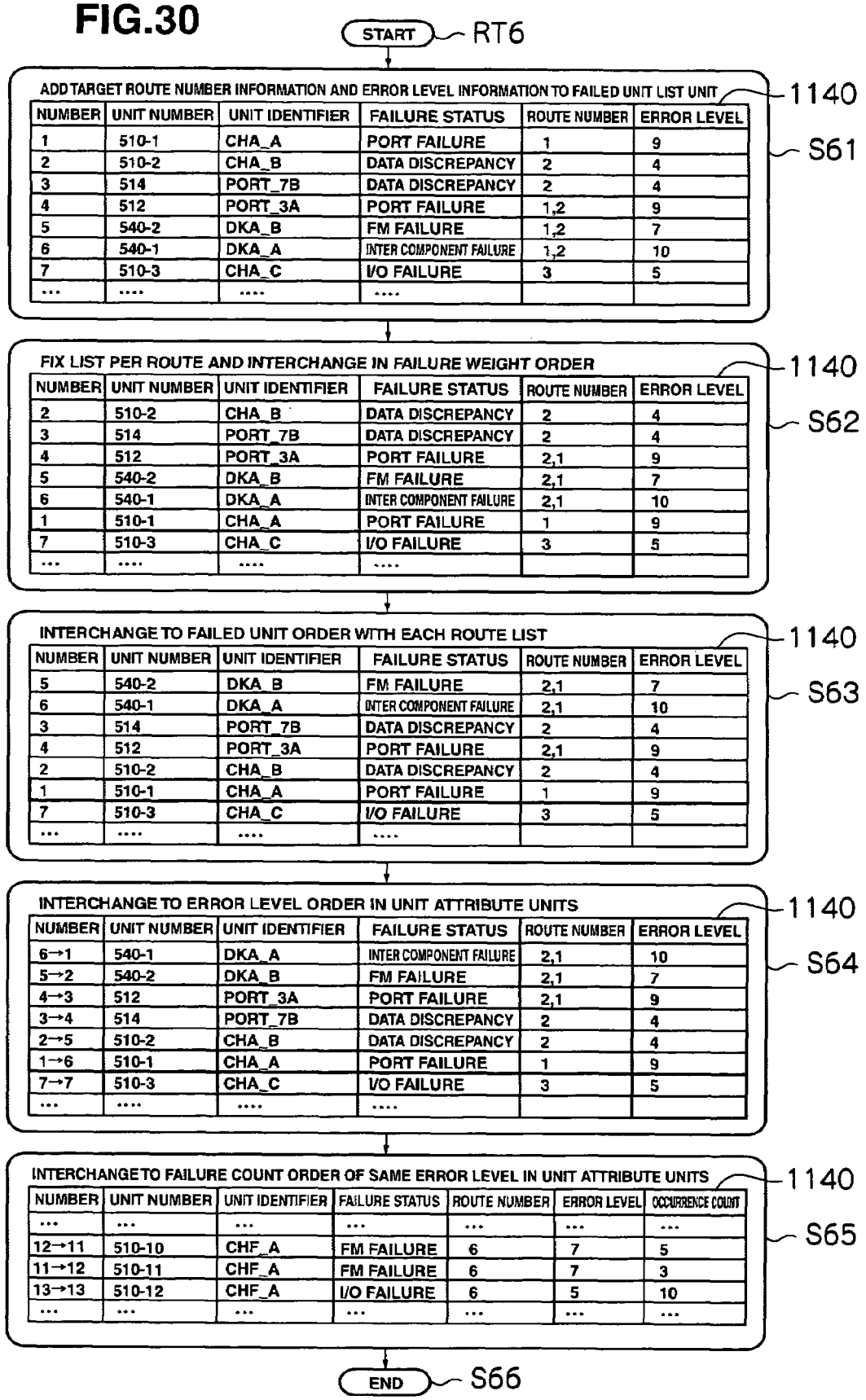
FIG. 30 is a flowchart explaining the abnormal unit list management table adjustment processing according to an embodiment of the present invention.

The abnormal unit list management table adjustment processing of the storage system 100 in this embodiment is now explained. FIG. 30 is a flowchart showing the specific processing routine of the storage apparatus 400 relating to the abnormal unit list management table adjustment processing in the storage system 100.

The management terminal 570, by initially executing the abnormal unit list management table adjustment processing program stored in a memory (not shown) of the management terminal 570 as a program for adjusting the abnormal unit list management table 1140, it acquires the corresponding route number from the route management table 1090 shown in FIG. 16 according to the abnormal unit list management table adjustment processing routine RT6 shown in FIG. 30, acquires the corresponding error level from the unit-by-unit error type management table 1030 shown in FIG. 10, and adds these to the abnormal unit list management table 1140 (S61).

Subsequently, the management terminal 570 fixes an abnormal unit list of each route, and interchanges the abnormal unit list management table 1140 in descending order from route 2→route 1→route 3 having the highest route failure weight calculated based on the route failure weight relationship management table 1130 shown in FIG. 27 and the route failure weight calculation formula of Formula 1 (S62). In this case, the management terminal 570 preferentially interchanges the routes with high failure weight regarding redundant routes. Here, although the management terminal 570 is used in route "1" and route "2" regarding number "4" to number "6", since the failure weight of route "2" is high, this will be treated as route "2".

Subsequently, the management terminal 570 interchanges the abnormal unit list management table 1140 in descending order from the highest unit failure weight based on the unit-by-unit failure weight shown in FIG. 26 for each route list (S63). Here, the management terminal 570 moves number "5" and number "6" to the top of the list, and moves number "2" below number "4".

Subsequently, the management terminal 570 interchanges the abnormal unit list management table 1140 in descending order from the highest error level for each unit in the route list (S64). Here, the management terminal 570 interchanges number "5" and number "6", and interchanges number "3" and number "4".

Subsequently, the management terminal 570 acquires the corresponding failure occurrence count from the unit-by-unit failure history management table 1050 shown in FIG. 12, adds this to the abnormal unit list management table 1140, compares the failure occurrence count of each same error level of units in the route list, and interchanges the abnormal unit list management table 1140 in descending unit failure weight order from the largest failure occurrence count (S66). Here, the management terminal 570 interchanges number "11" and number "12".

The management terminal 570 thereafter ends the abnormal unit list management table adjustment processing routine RT6 shown in FIG. 30 (S66).

Like this, with the storage apparatus 400, by executing the abnormal unit list management table adjustment processing routine RT6 shown in FIG. 30, it is possible to interchange the abnormal unit list management table 1140 in descending unit failure weight order from the unit requiring recovery of the failure status the most while giving consideration to the deterioration in the performance of the overall storage apparatus 400.

Returning to FIG. 28, when the management terminal 570 subsequently finishes performing the abnormal unit list management table adjustment processing routine RT6 shown in FIG. 30 (RT6), it selects abnormal units interchanged to be the top in descending order from the highest on the abnormal unit list of the abnormal unit list management table 1140, and checks whether the error level of the abnormal unit is "10" (S42).

When the error level of the abnormal unit is not "10" (S43: NO), the management terminal 570 checks whether a monitoring interval has been set regarding the error type of the abnormal unit from the unit-by-unit error type management table 1030 shown in FIG. 10 (S43).

When a monitoring interval has been set regarding the error type of the abnormal unit (S43: YES), the management terminal 570 refers to the unit-by-unit error type management table 1030 shown in FIG. 10 and executes the monitoring of the abnormal unit regarding the time of the monitoring interval of the error type of the abnormal unit (S44).

When the management terminal 570 executes the monitoring of the abnormal unit regarding the time of the monitoring interval of the error type of the abnormal unit (S44), or when a monitoring interval is not set regarding the error type of the abnormal unit (S43: NO), it designates the abnormal unit and commands the power supply control management unit 581 to perform recovery processing (designates the abnormal unit and sends the ""01" power supply reboot" command to the power supply control management unit 581) (S45).

Figure 31:
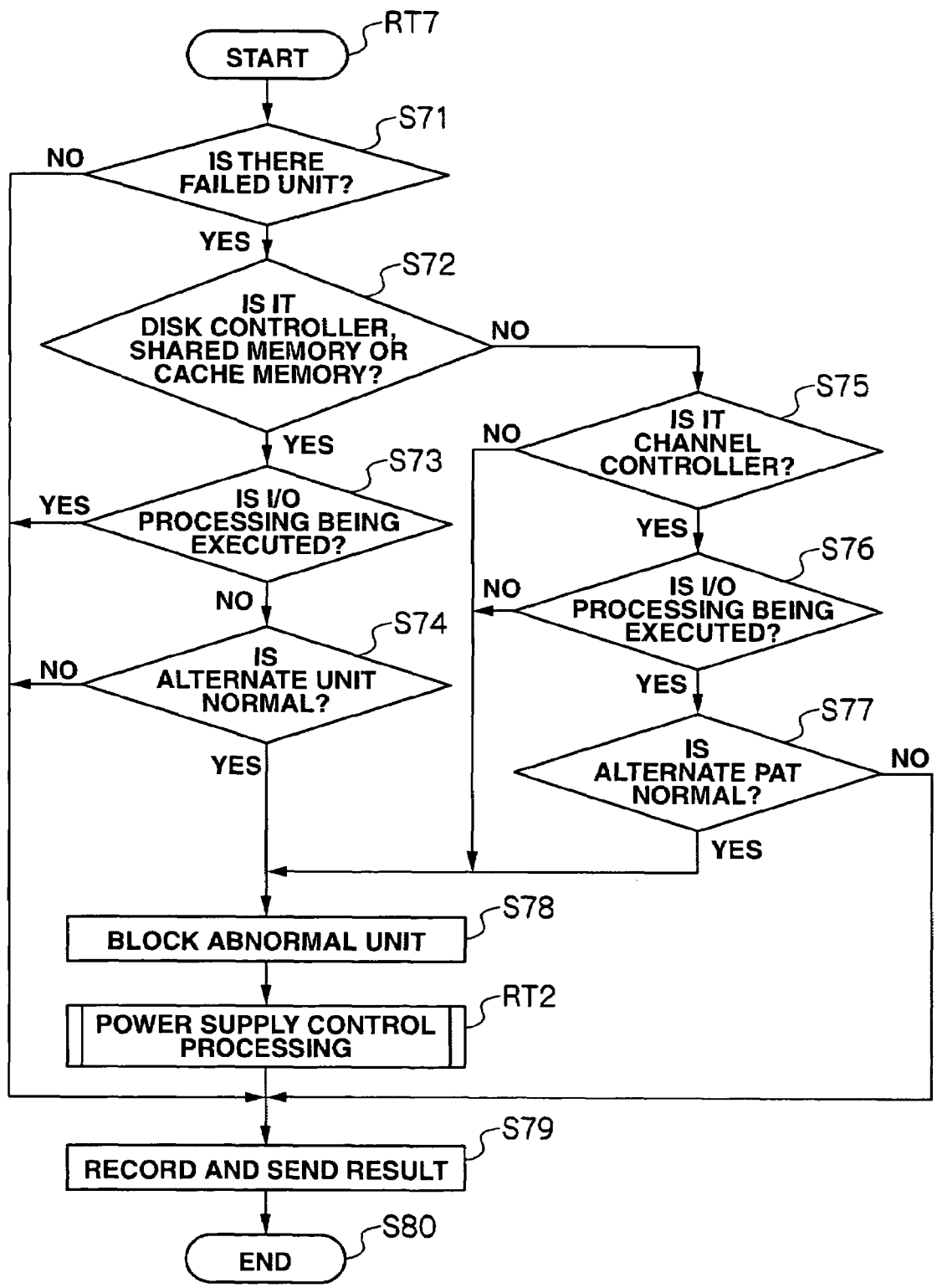
FIG. 31 is a flowchart explaining the designated failed unit recovery processing according to an embodiment of the present invention.

The designated failed unit recovery processing of the storage system 100 in this embodiment is now explained. FIG. 31 is a flowchart showing the specific processing routine of the storage apparatus 400 relating to the designated failed unit recovery processing in the storage system 100.

The power supply control management unit 581, by initially designating the abnormal unit from the management terminal 570, being commanded to perform recovery processing, and executing the designated failed unit recovery program stored in the memory 582 as a program for recovering the designated failed unit from the management terminal 570, refers to the unit-by-unit failure status management table 1040 shown in FIG. 11 stored in the shared memory 520 according to the designated failure status recovery processing routine RT7 shown in FIG. 31, and checks (reconfirms) whether the designated unit is a failed unit (S71).

When the designated unit is a failed unit (S71: YES), the power supply control management unit 581 checks whether the failed unit is a disk controller 540, a shared memory 520 or a cache memory 530 (S72).

When the failed unit is a disk controller 540, a shared memory 520 or a cache memory 530 (S72: YES), the power supply control management unit 581 checks whether I/O processing is being performed to the failed unit (S73). Specifically, a case where I/O processing is being performed, for instance, would be a case when commands or data are flowing to the failed unit.

When I/O processing is not being performed to the failed unit (S73: NO), the power supply control management unit 581 checks whether the alternate unit of the failed unit is normal (S74). For example, when recovery processing is being performed to the disk controller 540-1 in a state depicted in the disk controller-storage device relationship management table 1070 shown in FIG. 14, the power supply control management unit 581 determines that a disk controller 540-2 is existing and operating as an alternate unit, and therefore determines that the alternate unit of the failed unit is normal. Incidentally, the power supply control management unit 581 determines that the alternate unit of the failed unit is abnormal when the disk controller 540-2 of the disk controller-storage device relationship management table 1070 shown in FIG. 14 is "Δ" and in a warning state, and the warning state is cannot be used as a candidate for the alternate unit.

Contrarily, when the failed unit is a disk controller 540, a shared memory 520 or a cache memory 530 (S72: NO), the power supply control management unit 581 checks whether the failed unit is a channel controller 510 (S75).

When the failed unit is a channel controller 510 (S75: YES), the power supply control management unit 581 checks whether I/O processing is being performed to the failed unit (S76).

When I/O processing is not being performed to the failed unit (S73: NO), the power supply control management unit 581 checks whether the alternate path of the failed unit is normal (S77).

When the alternate path of the failed unit is normal (S77: YES), when I/O processing is not being performed to the failed unit (channel controller 510) (S73: YES), when the failed unit is not a channel controller 510 (S75: NO) or when the alternate unit of the failed unit (disk controller 540, shared memory 520 or cache memory 530) is normal (S74: YES), the power supply control management unit 581 blocks the abnormal unit (S78). Incidentally, blocking the abnormal unit refers to completely stopping the processing functions of the abnormal unit, and resetting the route as needed by updating the route management table 1090 shown in FIG. 16.

Subsequently, power supply control management unit 581 executes the power supply control processing according to the power supply control processing routine RT2 shown in FIG. 23 by executing the power supply control processing program stored in the memory 582 as a program for controlling the power supply of the prescribed unit (RT2). Incidentally, since the power supply control management unit 581 designates the abnormal unit from the management terminal 570 and receives the ""01" power supply reboot" command, it executes the power supply OFF processing of the abnormal unit and thereafter executes the power supply ON processing.

Subsequently, when the power supply control processing is executed (RT2), when the alternate path of the failed unit (channel controller 510) is not normal (S77: NO), when the alternate unit of the failed unit (disk controller 540, shared memory 520 or cache memory 530) is not normal (S74: NO), when I/O processing is being performed to the failed unit (disk controller 540, shared memory 520 or cache memory 530) (S73: YES), or when the designated unit is not a failed unit (S71: NO), the power supply control management unit 581 stores the respective results and sends such results to the management terminal 570 (S79).

Incidentally, when the alternate path of the failed unit (channel controller 510) is not normal (S77: NO), when the alternate unit of the failed unit (disk controller 540, shared memory 520 or cache memory 530) is not normal (S74: NO), when I/O processing is not being performed to the failed unit (disk controller 540, shared memory 520 or cache memory 530) (S73: YES), or when the designated unit is not a failed unit (S71: NO), the power supply control management unit 581 does not execute the power supply control processing, and does not execute the recovery processing of the failed unit.

For example, as cases when the alternate path of the failed unit (disk controller 540) is not normal (S74: NO), considered may be a case when the "status" of the disk controller-storage device relationship management table 1070 shown in FIG. 14 is "x", or as cases when the alternate path of the failed unit (channel controller 510) is not normal (S77: NO), considered may be a case when the "status" of the channel controller-disk controller relationship management table 1080 shown in FIG. 15 is "x".

The power supply control management unit 581 thereafter ends the designated failure status recovery processing routine RT7 shown in FIG. 31 (S80).

Like this, when I/O processing is not being performed to the failed unit (disk controller 540) (S73: YES), the power supply control management unit 581 does not execute the power supply control processing and does not execute the recovery processing of the failed unit. Thus, it is possible to effectively prevent any control contradictions such as asynchronous operations among disk controllers 540 or with other storage apparatuses.

When the failed unit is a memory (shared memory 520 and cache memory 530), in consideration that a memory is a shared resource and will affect the other routes, when I/O processing is being executed thereto (S73: YES), the power supply control management unit 581 does not execute the power supply control processing, and does not execute the recovery processing of the failed unit. Further, even if I/O is not flowing, if the alternate unit (duplicated opponent) is not normal, the power supply control management unit 581 will not execute the power supply control processing, and will not execute the recovery processing of the failed unit. It would not be an overstatement to say that a memory unit is the heart of the storage apparatus 400, and, since it contains important information and processing, recovery processing is executed with care. For example, when the alternate unit of a memory unit is in an overloaded state, when the processable capacity is insufficient, or the resource is oppressed due to resident (unprocessed) commands and resident (unprocessed) data, the power supply control management unit 581 does not execute the power supply control processing, and does not execute the recovery processing of the failed unit.

Incidentally, when the alternate path of the failed unit (channel controller 510) is not normal (S77: NO), when the alternate unit of the failed unit (disk controller 540, shared memory 520 or cache memory 530) is not normal (S74: NO), or when I/O processing is being performed to the failed unit (disk controller 540, shared memory 520 or cache memory 530) (S73: YES), the power supply control management unit 581 may have the user (maintenance worker) execute the power supply control processing and have such user (maintenance worker) select whether to execute recovery processing of the failed unit.

Returning to FIG. 28, when the management terminal 570 subsequently finished performing the designated failure status recovery processing routine RT7 shown in FIG. 31 (RT7), it receives the result sent from the power supply control management unit 581, stores this in the log, and executes the log output processing (S46). Incidentally, even when the error level of the abnormal unit is "10" (S43: YES), since the this is recognized in advance as absolutely impossible to recover, the management terminal 570 designates the abnormal unit and does not command the power supply control management unit 581 to perform recovery processing, stores this in the log, and executes the log output processing (S46).

Subsequently, the management terminal 570 executes the threshold value count up processing (S47). In this case, the management terminal 570 increments by "1" the threshold value of the error type of the abnormal unit in the unit-by-unit error type management table 1030 shown in FIG. 10 counted in the memory (not shown).

Subsequently, the management terminal 570 checks whether the processing at step S42 to step S47 is complete regarding all abnormal units of the abnormal unit list management table 1140 (S48). When the processing at step S42 to step S47 is not complete regarding all abnormal units of the abnormal unit list management table 1140 (S48: NO), the management terminal 570 returns to step S42, checks whether the error level of the abnormal unit that is next highest in the abnormal unit list after the processed abnormal unit is "10" (S42), and thereafter executes similar processing steps (S43 to S48, S42).

Contrarily, when the processing at step S42 to step S47 is complete regarding all abnormal units of the abnormal unit list management table 1140 (S48: YES), the management terminal 570 checks whether the abnormal unit is recoverable (S49). Specifically, the management terminal 570 performs the threshold value determination and completion determination, and ends the processing when the system is in a normal status, when the threshold value is exceeded, or when it is an irrecoverable state. Further, the management terminal 570 once again performs processing for comprehending all abnormal units when the system is in an abnormal state and in a recoverable state, or when the threshold value is not exceeded.

When the abnormal unit is not irrecoverable (S49: NO), the management terminal 570 returns to step S42, executes the table creation/update processing (RT1), and thereafter executes similar processing steps (S41 to S49, RT1).

Contrarily, when the abnormal unit is not recoverable (S49: YES), the management terminal 570 thereafter ends the failure status recovery processing routine RT5 shown in FIG. 28 (S50).

Specifically, the management terminal 570 performs the threshold value determination and completion determination, and ends the processing when the system is in a normal status, or the threshold value is exceeded, or when it is in an irrecoverable state. Further, the management terminal 570 once again performs processing for comprehending all abnormal units when the system is in an abnormal state and in a recoverable state, or when the threshold value is not exceeded.

Figure 32:
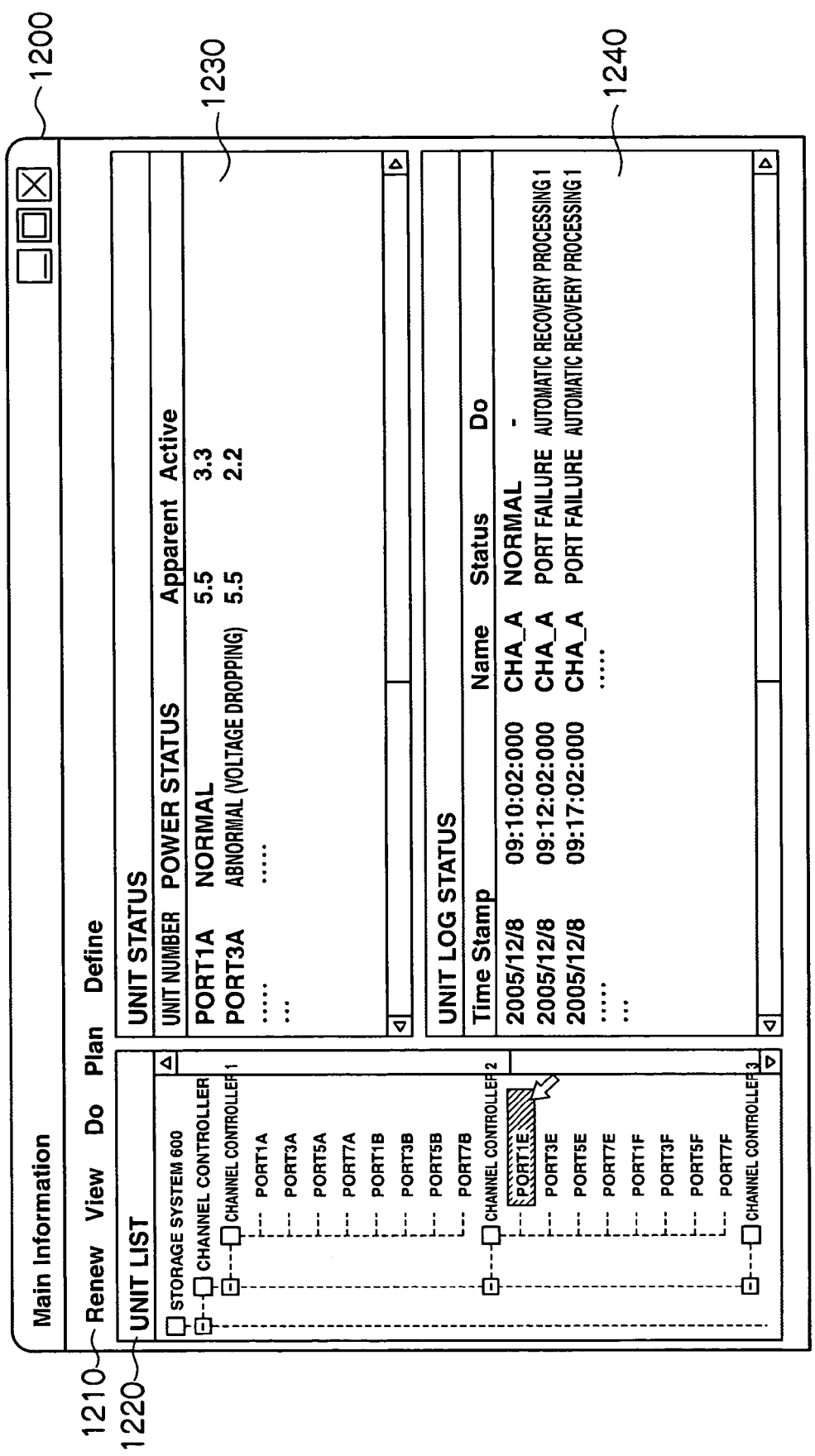
FIG. 32 is a conceptual diagram explaining the main information according to an embodiment of the present invention.

FIG. 32 shows the main information 1200 as an example of the human interface (H/I) displayed on the display unit (not shown) of the management terminal 570. The main information 1200 has a menu 1210, a tree 1220, a unit information display list 1230, and a log information display list 1240. The menu 1210 has Renew, View, Do, Plan, and Define. Renew performs update processing of various tables at an arbitrary timing (FIG. 22). View sequentially switches the display of the status or information (FIG. 3, 4, 8, 9, 11, 12, 13, 14, 15). Do performs failed unit recovery processing (FIG. 28). Plan sets the attribute in automation. Define displays the define information 1250.

Figure 33:
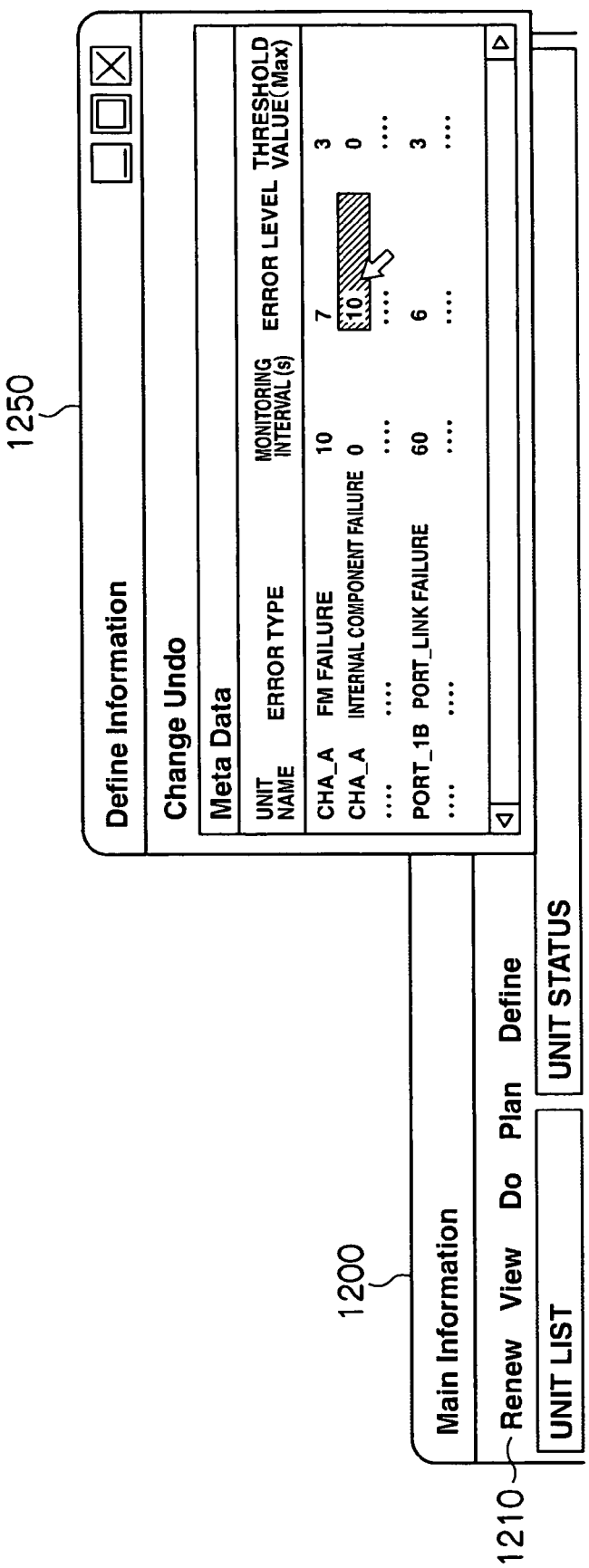
FIG. 33 is a conceptual diagram explaining the define information according to an embodiment of the present invention.

FIG. 33 shows the define information 1250. The define information 1250 displays the unit-by-unit error type management table 1030 shown in FIG. 10. The define information 1250 has Change and Undo. Change changes the default value. Undo returns to the default value.

The tree 1220 is a display frame capable of comprehending the overall storage apparatus 400. Incidentally, the tree 1220 does not have to be a tree structure, and may be a three-dimensional image. The tree 1220 may display the three-dimensional image as shown in FIG. 3 so as to enable the operation of the GUI (mouse) from such three-dimensional image. For example, the management terminal 570 is able to is able to display target information on the unit information display list 1230 or the log information display list 1240 by the user (maintenance worker) selecting the target portion with the mouse.

The respective column attributes of the unit information display list 1230 and the log information display list 1240 may be added or deleted as needed, and an arbitrary selection column may be sorted and displayed. Further, the columns may be interchanged and an arbitrary key may be used to sort and display all such columns. In this case, the management terminal 570 may execute the designated failed unit recovery processing (FIG. 31) by the user (maintenance worker) selecting an arbitrary unit number with the mouse.

Figure 34:
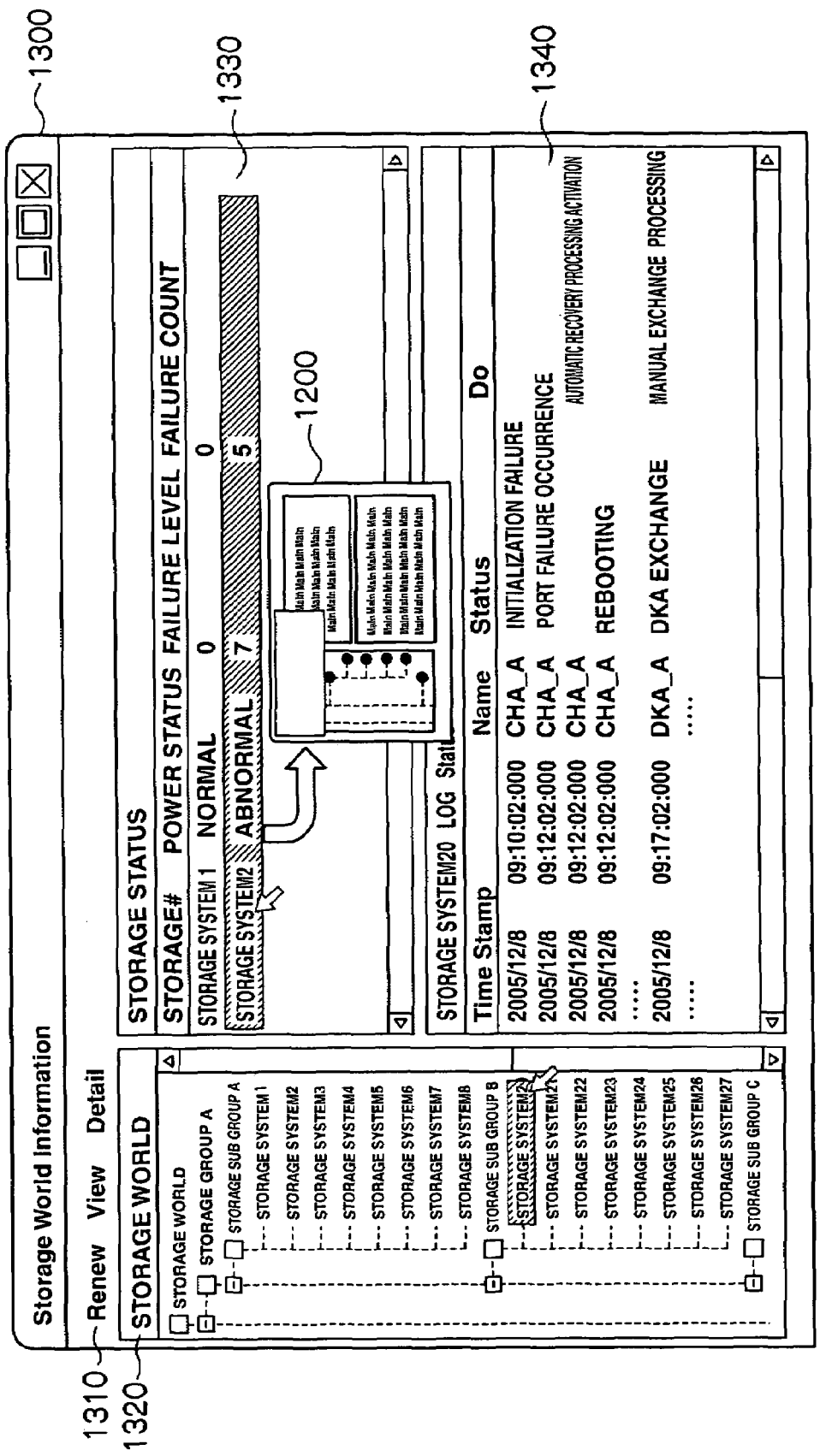
FIG. 34 is a conceptual diagram explaining the storage world information according to an embodiment of the present invention.

The main information 1200 may also be operated with a remote terminal 300 as a Web page provided by the Web server operating on the management terminal 570. Further, the remote terminal 300 may be installed with the storage world information 1300 shown in FIG. 34 capable of calling the main information 1200 shown in FIG. 32 so as to enable the operation of the main information 1200 shown in FIG. 32.

The storage world information 1300 has a menu 1310, a tree 1320, a storage apparatus information display list 1330, and a storage detailed log display list 1340. The tree 1320 is displayed as a tree structure representing the overall SAN-integrated storage apparatus or the image shown in FIG. 2. The tree 1320 recognizes and displays all storage apparatuses 400 in the SAN-integrated storage apparatus in the IP address broadcast or Web page discovery. The storage apparatus information display list 1330 displays the storage number, status, failure level and failure count in storage apparatus 400 units. The storage detailed log display list 1340 displays the time stamp, unit identifier, unit number, status and corresponding record. The menu 1310 has Renew, View, and Detail. Renew updates the information or status, View switches the display, and Detail calls and displays the main information 1200 of the target storage apparatus 400. Thus, the storage system 100 will be able to control and comprehend the overall SAN-integrated storage apparatus.

Like this, with the storage apparatus 100, the power supply OFF processing of the unit designated by the user (maintenance worker) is performed, and the power supply ON processing is thereafter performed by the user (maintenance worker) operating the management terminal 570 and issuing commands from the management terminal 570. Thus, with the storage system 100, a user (maintenance worker) does not have to be at the site where the storage apparatus 400 is located, and will be able to execute power supply OFF processing merely by issuing a command from the remote terminal 300, and thereafter perform the power supply ON processing. Accordingly, it is possible to improve the operability even more.

We claim:

1. A storage apparatus having a plurality of units for transferring or storing data sent from an information processing device, comprising:
    a failure notification unit for notifying a failed unit among said plurality of units;
    a power supply switching command unit for commanding the switching of off and on of the power supply of the failed unit notified from said failure notification unit; and
    a power supply switching unit for switching off and thereafter switching on the power supply of said failed unit according to the command of said power supply switching command unit,
    wherein said power supply switching command unit sets a plurality of unit routes from said information processing device to the unit to store said data, and commands the switching of off and on of the power supply of said failed unit notified from said failure notification unit from the heaviest route failure weight calculated based on the route failure weight calculation formula.

2. The storage apparatus according to claim 1, wherein said power supply switching command unit commands the switching of off and on of the power supply of said failed unit notified from said failure notification unit based on a remote operation.

3. A power supply control method of a storage apparatus having a plurality of units for transferring or storing data sent from an information processing device, comprising the steps of:
    notifying a failed unit among said plurality of units;
    commanding the switching of off and on of the power supply of the failed unit notified at said notifying step; and
    switching off and thereafter switching on the power supply of said failed unit according to the command at said commanding step,
    wherein, at said commanding step, a plurality of unit routes from said information processing device to the unit to store said data are set, and the switching of off and on of the power supply of said failed unit notified from said failure notification unit is commanded from the heaviest route failure weight calculated based on the route failure weight calculation formula.

4. The power supply control method of a storage apparatus according to claim 3, wherein, at said commanding step, the switching of off and on of the power supply of said failed unit notified from said failure notification unit is commanded based on a remote operation.

* * * * *